(12) United States Patent
Kubo

(10) Patent No.: US 11,442,324 B2
(45) Date of Patent: Sep. 13, 2022

(54) ELECTROCHROMIC ELEMENT, IMAGING APPARATUS AND TRANSMITTANCE VARIABLE WINDOW USING THE SAME

(71) Applicant: CANON KABUSHIKI KAISHA, Tokyo (JP)

(72) Inventor: Wataru Kubo, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 342 days.

(21) Appl. No.: 16/408,972

(22) Filed: May 10, 2019

(65) Prior Publication Data

US 2019/0353971 A1  Nov. 21, 2019

(30) Foreign Application Priority Data

May 18, 2018 (JP) .............................. JP2018-095828
Mar. 28, 2019 (JP) .............................. JP2019-062694

(51) Int. Cl.
| | | |
|---|---|---|
| *G02F 1/153* | (2006.01) | |
| *G02F 1/03* | (2006.01) | |
| *G02F 1/133* | (2006.01) | |
| *G02F 1/1335* | (2006.01) | |
| *H04N 9/16* | (2006.01) | |
| *G02F 1/1514* | (2019.01) | |
| *G02F 1/157* | (2006.01) | |
| *G02F 1/1503* | (2019.01) | |
| *E06B 3/67* | (2006.01) | |
| *E06B 9/24* | (2006.01) | |

(52) U.S. Cl.
CPC .......... *G02F 1/1514* (2019.01); *E06B 3/6722* (2013.01); *E06B 9/24* (2013.01); *G02F 1/1503* (2019.01); *G02F 1/157* (2013.01); *E06B 2009/2464* (2013.01); *G02F 2001/15145* (2019.01)

(58) Field of Classification Search
CPC ...... G02F 1/1523; G02F 1/1533; G02F 1/155; G02F 1/0102; G02F 1/163; G09G 3/16
USPC ................ 359/265–275, 277, 245–247, 242; 345/49, 105; 250/70; 348/814, 817; 438/929; 349/182–186
See application file for complete search history.

(56) References Cited

U.S. PATENT DOCUMENTS 4,902,108 A  2/1990 Byker
5,128,799 A  7/1992 Byker
(Continued)

FOREIGN PATENT DOCUMENTS

JP  10-138832 A  5/1998

OTHER PUBLICATIONS

Enrique Botana et al., "Inclusion of Cavitands and Calix[4]arenes into a Metallobridged para-(1H-Imidazo[4,5-f][3,8] phenanthrolin-2-yl)-Expanded Calix[4]arene," 46 Angew. Chem. Int. Ed. 198-201 (Oct. 2006).

*Primary Examiner* — Dawayne Pinkney
(74) *Attorney, Agent, or Firm* — Venable LLP

(57) ABSTRACT

The present disclosure includes an effective optical region within a transmittance variable region, and sets the transmittance variable region and the effective optical region so that a shortest distances from a periphery of the transmittance variable region to a periphery of the effective optical region, d1 and d2, are 7.5% or more and 25% or less of a length of the transmittance variable region on a straight line including the shortest distances, L1, in a vertical direction.

20 Claims, 14 Drawing Sheets

(56) References Cited

U.S. PATENT DOCUMENTS

| | | | |
|---|---|---|---|
| 5,282,077 A | 1/1994 | Byker | |
| 5,290,930 A | 3/1994 | Byker | |
| 5,481,395 A | 1/1996 | Byker | |
| 5,751,467 A | 5/1998 | Byker | |
| 5,801,873 A | 9/1998 | Byker | |
| 6,016,215 A | 1/2000 | Byker | |
| 6,020,987 A | 2/2000 | Baumann et al. | |
| 6,211,994 B1 | 4/2001 | Byker | |
| 6,351,328 B1 | 2/2002 | Byker | |
| 9,798,213 B2 | 10/2017 | Kubo et al. | |
| 2005/0078347 A1* | 4/2005 | Lin | G02F 1/1506 |
| | | | 359/265 |
| 2013/0258436 A1* | 10/2013 | Podbelski | B32B 17/10266 |
| | | | 359/265 |
| 2015/0362817 A1* | 12/2015 | Patterson | G02F 1/161 |
| | | | 359/275 |
| 2018/0024407 A1 | 1/2018 | Kubo et al. | |

\* cited by examiner

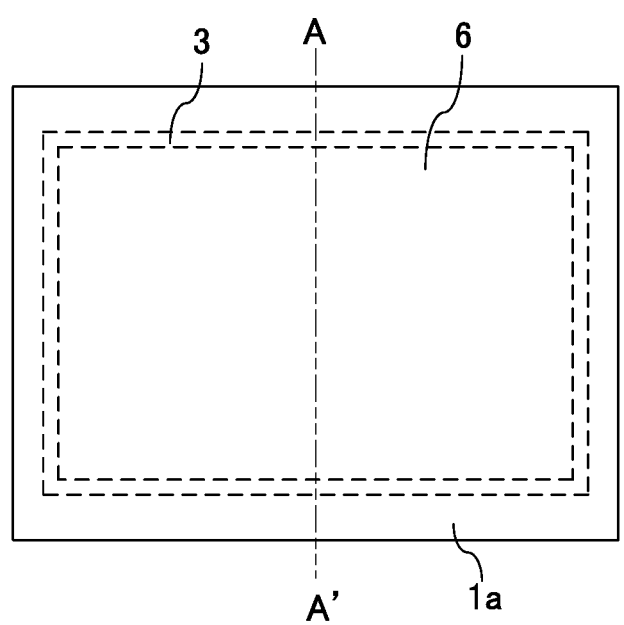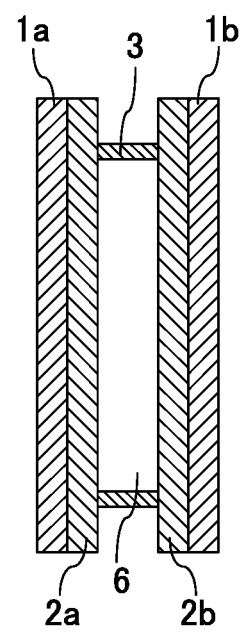

ELECTROCHROMIC ELEMENT, IMAGING APPARATUS AND TRANSMITTANCE VARIABLE WINDOW USING THE SAME

BACKGROUND OF THE INVENTION

Field of the Invention

The present disclosure relates to an electrochromic element, which adjusts the light amount of reflected light or transmitted light, an imaging apparatus and a transmittance variable window using the element.

Description of the Related Art

Compounds for which the optical characteristics (the absorption wavelengths, the absorbances and the like) of the substances change by electrochemical oxidation-reduction reactions are called electrochromic (EC) compounds. Electrochromic elements (EC elements) using EC compounds are applied to displays, reflectance variable mirrors, transmittance variable windows and the like.

The EC elements include an EC element using a solution layer containing an anodic EC compound, which is colored or bleached by oxidization, and a cathodic EC compound, which is colored or bleached by reduction, as an EC layer. When such an EC element is stood so that the in-plane direction of a pair of electrodes between which the EC layer exists is parallel to the vertical direction, and driven for a long period of time, the phenomenon in which the anodic EC compound and the cathodic EC compound separate in the vertical direction in the EC layer (segregation) may occur. When the segregation occurs, color components making up the color of a colored EC element may separate, and color inhomogeneity may occur between the top and the bottom in the vertical direction in the plane (vertical color separation). Since such vertical color separation causes the nonhomogeneity (color inhomogeneity) of light intensity dependent on the wavelength in an apparatus using the EC element as a dimming element, the vertical color separation is not preferable.

Japanese Patent Application Laid-Open No. H10-138832 (hereinafter Patent Literature 1) describes an EC element in which the movement of substances in a solution containing EC compounds is suppressed by increasing the viscosity of the solution by using a thickener, and the occurrence of vertical color separation is suppressed.

However, increasing the viscosity of a solution containing EC compounds as described in Patent Literature 1 suppresses the movement of substances also when the coloring state of an EC element is changed. Therefore, when the viscosity is increased too much, the response speed of the EC element may decrease. In the case where the EC element is driven at a high coloring density for a long period of time, or the like, only increasing the viscosity of the EC layer may suppress vertical color separation insufficiently.

SUMMARY OF THE INVENTION

An object of the present invention is to suppress the influence of vertical color separation in an EC element.

A first of the present invention is an electrochromic element having: a first electrode; a second electrode; and an electrochromic layer disposed between the first electrode and the second electrode, wherein the electrochromic element includes an effective optical region within a transmittance variable region, and when a shortest distance from a periphery of the effective optical region to a periphery of the transmittance variable region is d, and a length of the transmittance variable region on a straight line including the shortest distance is L in one direction in a plane of the effective optical region, the d is 7.5% or more and 25% or less of the L at both ends of the straight line.

A second of the present invention is an electrochromic element having: a first electrode; a second electrode; and an electrochromic layer disposed between the first electrode and the second electrode, wherein the electrochromic element includes an effective optical region within a transmittance variable region, and an average value of an index of color inhomogeneity at the time of coloring the effective optical region, d ($\Delta$OD), is 0.01 or less.

A third of the present invention is an electrochromic element having: a first electrode; a second electrode; and an electrochromic layer disposed between the first electrode and the second electrode, wherein the electrochromic element includes an effective optical region within a transmittance variable region, the electrochromic element has: a shield part covering a region from a periphery of the effective optical region to a periphery of the transmittance variable region along the periphery of the effective optical region, a shortest distance from the periphery of the effective optical region to the periphery of the transmittance variable region in the shield part is 7.5% or more and 25% or less of a length of the transmittance variable region on a straight line including the shortest distance.

A fourth of the present invention is an imaging apparatus having: a lens unit having a plurality of lenses; an imaging element which receives light having passed through the lens unit; and an electrochromic element disposed on a subject side of the imaging element, wherein the electrochromic element is the above-mentioned electrochromic element of the present invention.

A fifth of the present invention is a transmittance variable window having: a pair of transparent protective substrates; an electrochromic element disposed between the pair of transparent protective substrates; and a window frame into which peripheral edges of the transparent protective substrates and the electrochromic element are fitted, wherein the electrochromic element is the above-mentioned electrochromic element of the present invention.

Further features of the present invention will become apparent from the following description of exemplary embodiments with reference to the attached drawings.

BRIEF DESCRIPTION OF THE DRAWINGS

FIG. 1A is a figure illustrating the configuration of an example of an EC element schematically.

FIG. 1B is another figure illustrating the configuration of an example of the EC element schematically.

DESCRIPTION OF THE EMBODIMENTS

Figure 2:
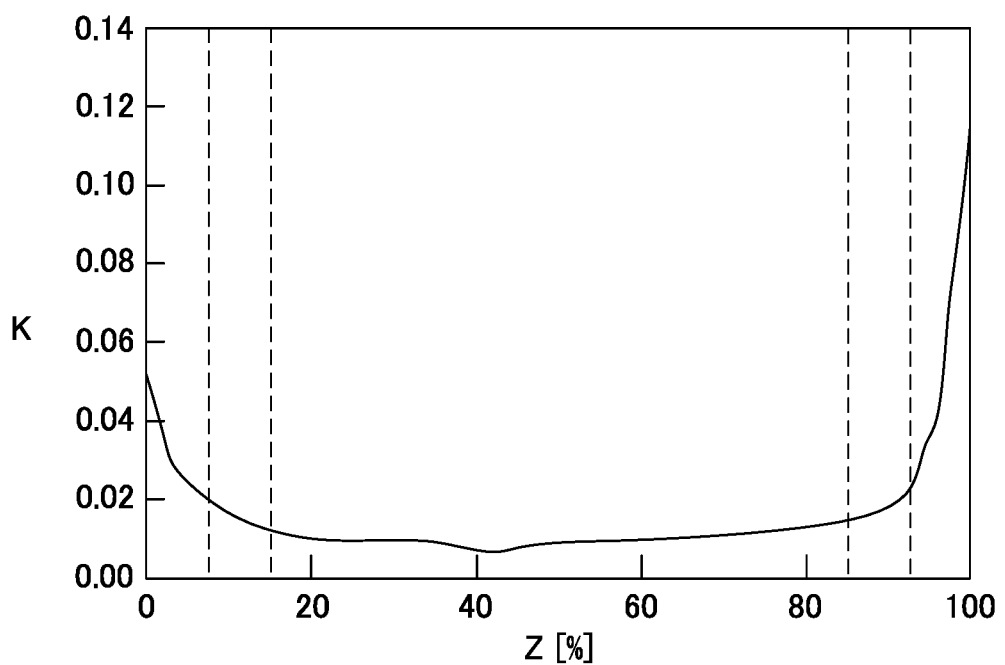
FIG. 2 is a graph illustrating the vertical color separation of the EC element.

Preferred embodiments of the present invention will now be described in detail in accordance with the accompanying drawings.

Embodiments of the present invention will be described below with reference to the drawings. The present invention is not limited to the following embodiments. Embodiments obtained by appropriately performing modification, improvement and the like on the following embodiments based on general knowledge of those skilled in the art in the range not deviating from the gist of the present invention are also included in the scope of the present invention.

[EC Element]

An electrochromic element (EC element) is a device which changes characteristics of outgoing light, typically the intensity of light, relative to incident light in a predetermined wavelength region by introducing light from the outside and making the introduced light pass through at least a part of an EC layer.

FIG. 1A and FIG. 1B illustrate the configuration of one example of an EC element schematically. FIG. 1A is a front view, and FIG. 1B is a sectional view at the position of A-A' in FIG. 1A. An EC element basically has a first electrode $2a$, a second electrode $2b$ and an electrochromic layer (EC layer) 6 disposed between the first electrode $2a$ and the second electrode $2b$. The EC element may have substrates $1a$ and $1b$ on the outside of the first electrode $2a$ and the second electrode $2b$, and may have a sealing material 3 for sealing the EC element between the first electrode $2a$ and the second electrode $2b$. The EC layer 6 has a solvent, an anodic EC compound and a cathodic EC compound.

Components which the EC element has will be described below. In the present invention, "transparent" means that the transmittance of light is 50% or more and 100% or less, more preferably 70% or more and 100% or less, and "light" in the present invention is light in a wavelength region which is the use target of the EC element. For example, when the EC element is used as an optical filter of an imaging apparatus for a visible light region, "light" refers to light in the visible light region. When the EC element is used as an optical filter of an imaging apparatus for an infrared region, "light" refers to light in the infrared region. A "transmission type" is an aspect in which light comes in from one substrate side, passes the EC layer 6, and goes out of the other substrate side. A "reflective type" is an aspect in which light comes in from one substrate side, passes the EC layer 6, reflects on the other substrate side, and goes out of the one substrate side. In the case of the reflective type, the reflective type has the electrode or the substrate on the reflecting side as a reflective layer, or includes a reflective layer or a scattering layer for reflecting the light which transmits the EC layer 6 either between the electrode and the substrate or on the outside of the substrate.

<Substrate>

As the substrates $1a$ and $1b$, both substrates are transparent substrates when the EC element is a transmission type, and at least the substrate on the side where light comes and goes needs to be a transparent substrate when the EC element is a reflective type.

As the transparent substrates, colorless or colored glass or transparent resin can be specifically used. Examples of the glass include optical glass, silica glass, white glass, blue glass, borosilicate glass, non-alkali glass and chemically strengthened glass. Examples of the transparent resin include polyethylene terephthalate, polyethylene naphthalate, polynorbornene, polyamides, polysulfones, polyethersulfones, polyetheretherketones, polyphenylene sulfide, polycarbonates, polyimides and polymethyl methacrylate. In the case where a non-transparent substrate is used, the non-transparent substrate is not particularly limited as long as the non-transparent substrate is an insulating member.

<Electrode>

As the constituent material of the electrodes $2a$ and $2b$, a material which exists stably in the operating environment of the EC element and can advance an oxidation-reduction reaction promptly in response to the impression of voltage from the outside is preferably used. For example, the below-mentioned transparent electroconductive material, metal or the like can be used.

When the EC element is a transmission type, both the first electrode $2a$ and the second electrode $2b$ are transparent electrodes, and when EC element is a reflective type, at least the electrode on the side where light comes and goes is a transparent electrode. When the EC element is a reflective type, the electrode on the side which reflects light is an electrode which has reflexibility, or the electrode is a transparent electrode and includes a reflective layer and a scattering layer behind. This reflective layer or scattering layer may be used as a substrate. Forming an electroconductive reflective layer and an electroconductive scattering layer between the electrode and the EC layer on the opposite side enables improving the degree of the freedom of the optical characteristics of such an electrode. An opaque electrode and an electrode which absorbs target light can also be used.

As the transparent electrode, a film formed of a transparent electroconductive material, a transparent electrode in which a metal wire is partially disposed on the film, or the like can be used. Although the metal wire itself is not transparent, a transparent electrode in which the transmittance of light is adjusted to the above-mentioned range by disposing this partially is also included as a transparent electrode in the present invention.

Examples of the transparent electroconductive material include transparent electroconductive oxides and carbon materials such as carbon nanotubes. Examples of the transparent electroconductive oxides include tin-doped indium oxide (ITO), zinc oxide, gallium-doped zinc oxide (GZO), aluminum-doped zinc oxide (AZO), tin oxide and antimony-doped tin oxide (ATO). Examples of the transparent electroconductive oxides also include fluorine-doped tin oxide (FTO) and niobium-doped titanium oxide (TNO). Among these, ITO or FTO is preferable.

When the electrodes $2a$ and $2b$ are formed of a transparent electroconductive oxide, the film thickness of an electrode is preferably 10 nm or more and 10 µm or less. Using ITO or FTO formed especially in the range of a film thickness of 10 nm or more and 10 µm or less as an electrode enables high transparency and chemical stability to be compatible.

When the transparent electrode is formed of a transparent electroconductive oxide, the electrode may have a structure in which sublayers made of the transparent electroconductive oxide are stacked. This facilitates achieving high electroconductivity and high transparency.

Although the constituent material of a non-transparent electrode or a metal wire is not particularly limited, an electrochemically stable metal such as silver (Ag), gold (Au), platinum (Pt) or titanium (Ti) is used preferably. As the arrangement pattern of the metal wire formed on the transparent electrode, a grid shape is used preferably. Although an electrode having a metal wire is typically a flat electrode, a curved electrode can also be used if needed.

The thickness of the EC layer 6, namely the distance between the first electrode $2a$ and the second electrode $2b$, is preferably 1 µm or more and 500 µm or less. When the distance between the electrodes is increased, the thickness of the EC layer 6 can be thickened, and an enough amount of the EC compounds can be disposed in the EC layer 6 to make the EC layer 6 function as an EC element effectively. As a result, the EC element is advantageous from the viewpoint of easily making transmittance at the time of coloring lower. Meanwhile, when the distance between the electrodes is reduced, the EC element is advantageous from the viewpoint of easily increasing the response speed of the EC element. Adjusting the distance between the electrodes to 1 µm or more and 500 µm or less as mentioned above facilitates achieving low transmittance at the time of coloring and quick response.

<Sealing Material>

The sealing material 3 is disposed between the first electrode $2a$ and the second electrode $2b$, and connects the first electrode $2a$ and the second electrode $2b$ near the peripheries thereof. It is preferable that the sealing material 3 is chemically stable, and includes a material which gas and liquid hardly permeate and which does not inhibit the oxidation-reduction reactions of the EC compounds. For example, an inorganic material such as glass frit; an organic material such as an epoxy resin or an acrylic resin; a metal; or the like can be used. The sealing material 3 may have the function to maintain the distance between the first electrode $2a$ and the second electrode $2b$ by incorporating a spacer material, or the like. In this case, a space for disposing the EC layer 6 between the electrodes can be formed by the first electrode $2a$, the second electrode $2b$ and the sealing material 3.

When the sealing material 3 does not have the function to define the distance between the first electrode $2a$ and the second electrode $2b$, a spacer having the function to define and maintain the distance between both electrodes may be disposed separately, and the distance between both electrodes may be maintained. As the material of the spacer, an inorganic material such as a silica bead or a glass fiber; or an organic material such as polyimides, polytetrafluoroethylene, polydivinylbenzene, fluororubber or an epoxy resin can be used.

<Electrochromic Layer>

The EC layer 6 is a complementary type having a solvent, an anodic EC compound and a cathodic EC compound. The EC layer 6 is preferably a solution layer in which the anodic EC compound and the cathodic EC compound are dissolved in the solvent and may further contain additives such as a supporting electrolyte and a thickener.

(Solvent)

The solvent can be appropriately selected in view of the solubilities, vapor pressures, viscosities, potential windows and the like of solutes to be used such as an anodic EC compound and a cathodic EC compound depending on use. A solvent which can dissolve the anodic EC compound and cathodic EC compound to be used is preferable. It is preferable that the solvent is a solvent having polarity. Specific examples of the solvent include organic polar solvents such as ether compounds, nitryl compounds, alcoholic compounds, dimethyl sulfoxide, dimethoxyethane, sulfolane, dimethylformamide, dimethylacetamide or methylpyrrolidinone; and water. Solvents containing cyclic ethers such as propylene carbonate, ethylene carbonate, γ-butyrolactone, valerolactone or dioxolane among these are preferable. Solvents containing these cyclic ethers are preferable from the viewpoints of the solubilities, boiling points, vapor pressures, viscosities, and potential windows of the EC compounds. A solvent containing propylene carbonate among the cyclic ethers is particularly preferable. An ionic liquid can also be used as a solvent.

The viscosity of the EC layer 6 may be enhanced, or the EC layer may be gelated by further incorporating a polymer, a gelling agent or a thickener into the above-mentioned solvent. A polymer electrolyte and a gel electrolyte may be used as a solvent or an electrolytic solution. Examples of the polymer include, but are not particularly limited to, polyacrylonitrile, carboxymethylcellulose, polyvinyl chloride, polyethylene oxide, polypropylene oxide, polyurethanes, polyacrylates, polymethacrylates, polyamides, polyacrylamide, polyesters, Nafion (registered trademark) and derivatives thereof. When the viscosity of the EC layer 6 may be enhanced or the EC layer may be gelated, the movement of EC compounds in the EC layer 6 is suppressed. Therefore, the occurrence of vertical color separation can be further suppressed.

The EC layer 6 may further have a supporting electrolyte. The supporting electrolyte is not particularly limited as long as the supporting electrolyte is an ionically dissociative salt, and exhibits good solubility in a solvent, the supporting electrolyte is preferably a stable substance at the operation potential of the EC element. A suitable cation and a suitable anion can be selected from the groups consisting of various cations and various anions, respectively. The supporting electrolyte obtained by combining the both can be used. Examples of the cation include metal ions such as alkali metal ions and alkaline-earth metal ions; and organic ions such as a quaternary ammonium ion. Specific examples of the cation include $Li^+$, $Na^+$, $K^+$, $Ca^{2+}$, $Ba^{2+}$, a tetramethylammonium ion, a tetraethylammonium ion and tetrabutylammonium. Examples of the anion include anions of various fluorine compounds and halide ions. Specific examples of the anion include $ClO_4^-$, $SCN^-$, $BF_4^-$, $AsF_6^-$, $CF_3SO_3^-$, $CF_3SO_2NSO_2CF_3^-$, $PF_6^-$, $I^-$, $Br^-$ and $Cl^-$. The EC compound may also serve as the function of a supporting electrolyte using a salt compound as the EC compound. Examples of the EC compound which is also a salt compound include viologen derivatives.

A method for forming the EC layer 6 is not particularly limited. Examples of the method include a method for injecting a liquid containing the solvent and the EC compounds into a gap provided between the first electrode 2a and the second electrode 2b by a vacuum injection method, an air injection method, a meniscus method or the like. For example, the liquid containing the solvent and the EC compounds is specifically injected into a cell formed by the electrodes 2a and 2b and the sealing material 3 from an opening (not illustrated) formed in a portion of the electrode 2a or 2b or the sealing material 3, and the opening is sealed by a sealing member.

(EC Compound)

An EC compound is a type of oxidation-reduction substances, and is a compound an optical characteristic of which changes by an oxidation-reduction reaction in the target light wavelength region of an EC element. Examples of the optical characteristic include a light absorption characteristic and a light reflection characteristic, and the optical characteristic is typically a light absorption characteristic. The "oxidation-reduction substance" mentioned here means a substance which can cause oxidation-reduction reactions repeatedly in the predetermined potential range. It can also be said that the EC compound is a compound the light transmittance of which changes by oxidation-reduction reactions in the target light wavelength region of the EC element. "An optical characteristic of which changes" mentioned here typically indicates switching from a light absorption state to a light transmission state and from the light transmission state to the light absorption state. In this case, it can also be said that the EC compound is a compound which switches from a light absorption state to a light transmission state and from the light transmission state to the light absorption state by an oxidation-reduction reaction.

An "anodic EC compound" means an EC compound an optical characteristic of which changes by an oxidation reaction in the target light wavelength region of the EC element when the EC element is driven. The oxidation reaction is usually a reaction in which electrons are removed from the EC compound. A "cathodic EC compound" means an EC compound an optical characteristic of which changes by a reduction reaction in the target light wavelength region of the EC element when the EC element is driven. The reduction reaction is usually a reaction in which electrons are given to EC compound. Typical examples of the anodic EC compound include a compound which changes from a light transmission state to a light absorption state by an oxidation reaction when the EC element is driven. Typical examples of the cathodic EC compound include a compound which changes from a light transmission state to a light absorption state by a reduction reaction when the EC element is driven. An EC compound is not limited to these, but the EC compound may be a compound which changes from a light absorption state to a light transmission state by an oxidation reaction or a reduction reaction when the EC element is driven. An example in which the EC element changes from a light transmission state (bleached state) to a light absorption state (colored state) when the EC element is driven, which is a typical example, will be mentioned and described in the following description to facilitate the imagination of change in the optical absorption characteristic of the EC compound.

Both anodic EC compound and cathodic EC compound cause an oxidation reaction or a reduction reaction, and have at least two mutually different states by controlling voltage impressed between the first electrode 2a and the second electrode 2b, or switching on and off the EC element. In the present invention, a state in which an EC compound is oxidized by an oxidation reaction of one or more electrons is called the "oxidized form" of the EC compound, and a state in which an EC compound is reduced by a reduction reaction of one or more electrons is called the "reduced form" of the EC compound. That is, although an anodic EC compound is a reduced form in a state in which the EC element is not driven, a part thereof becomes an oxidized form in a state in which the EC element is driven. Although a cathodic EC compound is an oxidized form in a state in which the EC element is not driven, a part thereof becomes a reduced form in a state in which the EC element is driven.

In some literatures, the expression of changing from the oxidized form to the reduced form through a neutral form (or vice versa) also exists as an expression which indicates the states of the EC compound. However, fundamentally in the recognition that it is a reduced form which is produced when an oxidized form is reduced, and it is an oxidized form which is produced when a reduced form is oxidized, the description of the oxidized form and the reduced form is adopted in the following description. For example, ferrocene having divalent iron (in a neutral form as a whole molecule) is a reduced form of ferrocene (anodic oxidation-reduction substance) when ferrocene functions as an anodic oxidation-reduction substance. A species in which iron becomes trivalent by oxidizing this reduced form (ferrocenium ion) is an oxidized form of ferrocene (anodic oxidation-reduction substance), especially a first oxidized form. When a dicationic salt of viologen functions as a cathodic EC compound, the dicationic salt is an oxidized form of a cathodic EC compound. A monocationic salt obtained by subjecting the dicationic salt to one-electron reduction is a reduced form of a cathodic EC compound, especially a first reduced form.

An EC compound used for the present invention is an organic compound. Although the EC compound may be a low-molecular organic compound or may be a high-molecular organic compound, it is preferable that the EC compound be a low-molecular organic compound having a molecular weight of 2000 or less. It is preferable that both an anodic EC compound and a cathodic EC compound be compounds which change from a bleached form to a colored form by driving the EC element. A plurality of kinds of anodic EC compounds and a plurality of kinds of cathodic EC compounds may be contained as EC compounds.

Examples of an anodic EC compound include thiophene derivatives; amines such as phenazine derivatives or triarylamine derivatives having aromatic rings; pyrrole derivatives; thiazine derivatives; triarylmethane derivatives; bisphenylmethane derivatives; xanthene derivatives; fluoran derivatives; and spiropyran derivatives. Among these, amines having a low-molecular aromatic ring are preferable, and dihydrophenazine derivatives are the most preferable as the anodic EC compound.

These compounds easily provide an EC element having a desired absorption wavelength profile, have high durability in repeated use, and are preferable. These compounds have absorption peaks in the ultraviolet region in a neutral state (reduced form), do not have absorption in the visible light region, but have a bleached state in which the transmittance in the visible light region is high. When these molecules become radical cations (oxidized form) by an oxidation reaction, the absorption peaks shift to the visible light region, and these molecules become colored. The absorption wavelengths thereof can be designed freely by increasing or reducing π conjugation length, modifying substituents and changing a π conjugated system. "Low-molecular" mentioned here means a molecular weight of 2000 or less.

Although the cathodic EC compound is not particularly limited, examples of the cathodic EC compound include pyridine derivatives such as viologen derivatives; and quinone compounds. Among these, pyridine derivatives such as viologen derivatives are used most preferably. Accordingly, the cathodic EC compound is preferably a compound having a pyridine skeleton or a quinone skeleton. The cathodic EC compound is further preferably a compound (1) represented by the following formula (1).

[Formula 1]

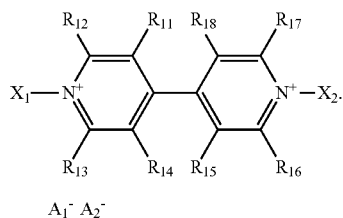

(1)

In the above-mentioned formula (1), $X_1$ and $X_2$ are each independently selected from the group consisting of an alkyl group, an aralkyl group and an aryl group. The alkyl group, the aralkyl group and the aryl group may be substituted. $R_{11}$ to $R_{18}$ are each independently any of a hydrogen atom, an alkyl group, an aralkyl group, an alkoxy group, an aryl group, a heterocyclic group, a substituted amino group or a halogen atom and an acyl group. The alkyl group, the alkoxy group, the aralkyl group, the aryl group and the heterocyclic group may be substituted. $A^{1-}$ and $A^{2-}$ each independently represents a monovalent anion.

<Formation Process of Vertical Color Separation and Profile Thereof>

The present inventor has revealed the formation process of vertical color separation by repeating the measurement and analysis of vertical color separation which occurs in an EC element. Specifically, vertical color separation is formed through the following two steps.

(i) Formation of Aggregate Due to Decrease in Affinity of the Colored Form of EC Compound for a Solvent Change in the ionic valency of the EC compound at the time of coloring decreases affinity for a solvent and forms aggregates.

(ii) Movement of Formed Aggregates in Vertical Direction

Since the formed anodic EC compound and the formed cathodic EC compound have difference in the density of the aggregate, the formed aggregates move in the vertical direction using the density difference as driving force to form vertical color separation. The vertical color separation results in the formation of color separation in the vertical direction due to the formation mechanism. A case where an EC element in which typical vertical color separation occurs is used as an ND filter of an imaging apparatus will be simulated. An EC element was manufactured in the configuration of FIG. 1A and FIG. 1B using a solution in which a compound (2) represented by the following formula (2) as an anodic EC compound and a compound (3) represented by the following formula (3) as a cathodic EC compound were dissolved in propylene carbonate which is a solvent as an EC layer 6.

[Formula 2]

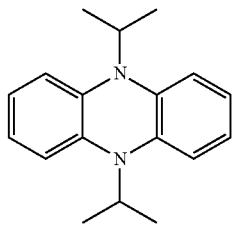

(2)

[Formula 3]

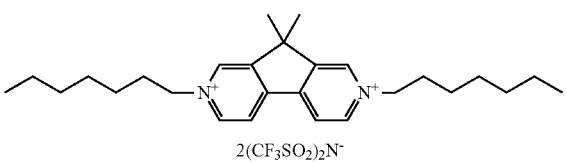

(3)

$2(CF_3SO_2)_2N^-$

When the above-mentioned EC element is stood and driven so that the electrode surfaces are parallel to the vertical direction, vertical color separation into intense yellow at the top and intense blue at the bottom is formed. Thus, vertical color separation produces regions having intense color inhomogeneity at the ends in the vertical direction. This color inhomogeneity is further recognized when color change between regions which are adjacent in the plane is great. Here, evaluation was performed by defining the absolute value of the gradient of the below-mentioned index d (ΔOD) of color separation as a parameter (K) using the d (ΔOD) to express the color change between the regions which were adjacent. The graph of FIG. 2 was plotted with the axis of abscissas illustrating the position of the EC layer of the above-mentioned EC element in the vertical direction by defining the uppermost part as 0% and the lowermost part as 100% and the axis of ordinates illustrating the absolute value K of the gradient of the d (ΔOD) calculated from the profile of the simulation image of the EC element.

In FIG. 2, it is found that the absolute value K of the gradient of the d (ΔOD) increases greatly in inside regions within 7.5% from both upper and lower ends of the EC layer 6. In such regions, vertical color separation is recognized strongly. It is found that change in this index is very slight in the inside region except regions within 15% from both upper and lower ends of the EC layer 6, and vertical color separation is hardly recognized in this inside region.

Since the EC element is an element the color change of which meets the eye directly and indirectly, the appearance thereof is important. It is requested that the area of the bezel part (frame part) surrounding an actually used region (effective optical region) be reduced as much as possible from this viewpoint. Since the EC element is a current drive element fundamentally, current increases with increase in an electrode area. It is requested that the electrode area outside the effective optical region be reduced as much as possible from the viewpoint of power consumption reduction. The voltage drop due to electrode resistance, especially the resistance of a transparent electrode may lead to the transmittance inhomogeneity in the plane of the EC element with increase in current. It is requested that the electrode area outside the effective optical region be reduced as much as possible also from this point. Thus, it is naturally assumed that the region outside the effective optical region is reduced in the EC element.

The present inventor has proposed that the area in which the electrodes 2a and 2b and the EC layer 6 of the EC element are in contact and which is excluded from the effective optical region dare to be increased and designed in contrast with this assumption. Although the regions in which the electrodes 2a and 2b and the EC layer 6 are in contact can be the effective optical region, it has been proposed that daring to exclude the ends thereof from the effective optical region reduces the influence of vertical color separation in the EC element.

Figure 3A:
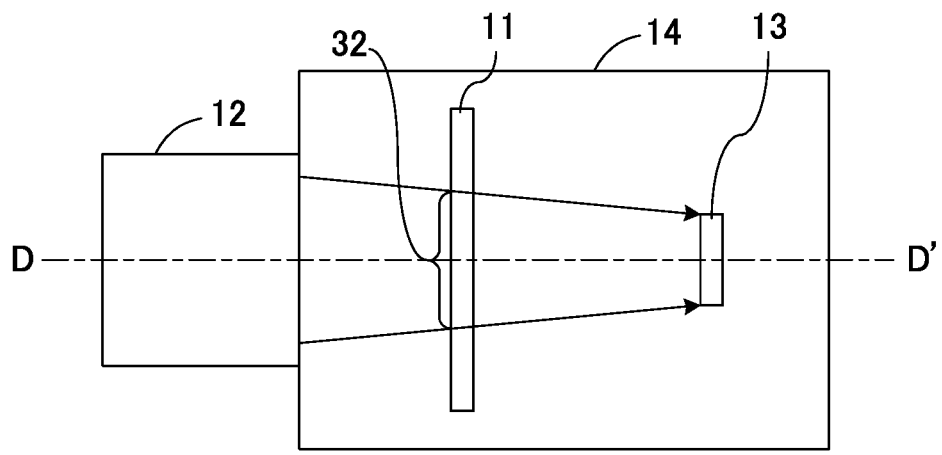
FIG. 3A is a figure illustrating the configuration of an imaging apparatus and a transmittance variable window using the EC element schematically.
Figure 3B:
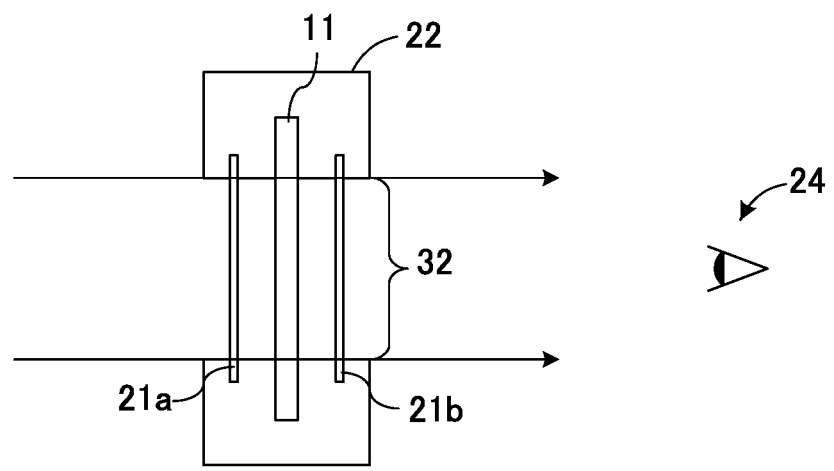
FIG. 3B is another figure illustrating the configuration of an imaging apparatus and a transmittance variable window using the EC element schematically.

In the present invention, an effective optical region is a region for the transmittance change of EC element to achieve a required function in an apparatus such as an imaging apparatus and a transmittance variable window using the EC element. The effective optical region will be specifically described using FIG. 3A and FIG. 3B. FIG. 3A is a sectional view illustrating the configuration of an imaging apparatus using the EC element schematically. FIG. 3B is a sectional view illustrating the configuration of a transmittance variable window using the EC element schematically.

In FIG. 3A, reference numeral 11 denotes an EC element, reference numeral 12 denotes a lens unit, reference numeral 13 denotes an imaging element, and reference numeral 14 denotes an imaging unit. In such an imaging apparatus, the EC element 11 functions as an optical filter. The imaging apparatus may separately have an optical system such as a UV filter, an IR filter, a diaphragm and a mirror; an electronic circuit assigned to arithmetic processing, recording and the like; an output system such as a display element; and an input system such as a microphone which are not illustrated. In the same figure, although the EC element 11 as an optical filter is disposed downstream of the lens unit 12 on an optical path, the EC element 11 may be on the upstream side of the lens unit 12, or may be incorporated into the lens unit 12 as an optical filter.

As illustrated in FIG. 3A, light coming from a subject passes through the lens unit 12 as indicated by arrows, forms an image on the imaging element 13, and acquires the image in the imaging apparatus. At this time, a region in which the light reaching effective pixels of the imaging element 13 through the lens unit 12 transmits the EC element 11 is defined as an effective optical region 32. The transmittance change of the EC element 11 in this region 32 functions to dim light as an optical filter in order that an imaging apparatus achieves an imaging function appropriately.

In FIG. 3B, reference numeral 11 denotes an EC element, reference numerals 21a and 21b denote transparent protective substrates, reference numeral 22 denotes a window frame, and reference numeral 24 denotes an observer. The EC element 11 is used as an optical filter which controls the light of a window, and the peripheries of the EC element 11 and the transparent protective substrates 21a and 21b are fitted into the window frame 22.

In FIG. 3B, the transmittance variable window functions to pass light which comes from the outside (the left on the paper) through the EC element 11, control the light and send the light to an internal observer 23. A region through which the light which reaches the observer 24 transmits is defined as the effective optical region 32 of the EC element 11 at this time. The transmittance change of the EC element 11 in this region 32 functions to dim light as an optical filter to achieve the light control function of the transmittance variable window appropriately.

Figure 4A:
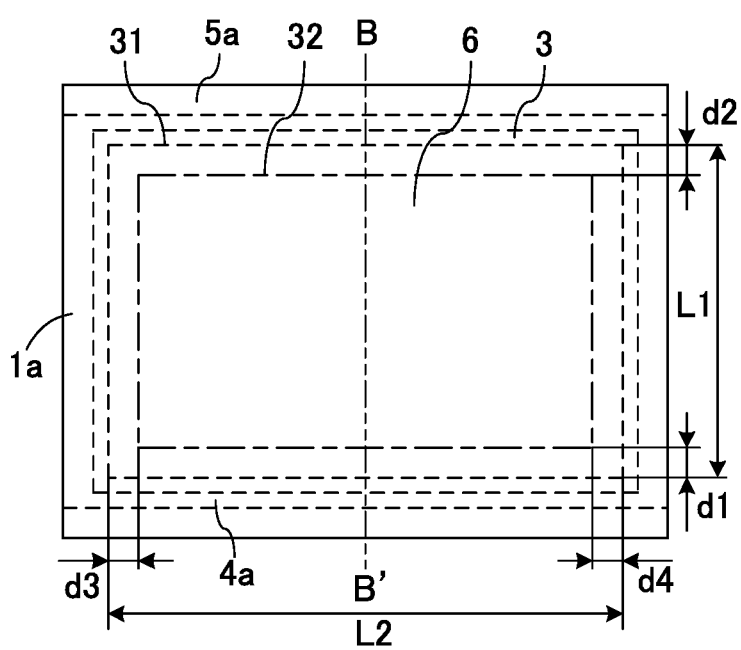
FIG. 4A is a figure illustrating the configuration of one embodiment of the EC element of the present invention schematically.
Figure 4B:
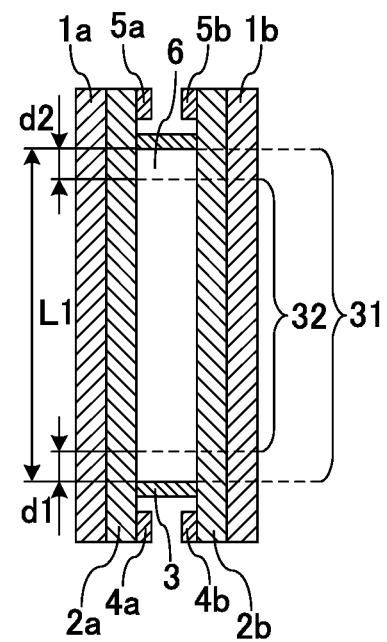
FIG. 4B is another figure illustrating the configuration of one embodiment of the EC element of the present invention schematically.

In the present invention, the transmittance variable region refers to a region in which transmittance changes on the EC element, and the effective optical region is defined in the transmittance variable region. The transmittance variable region and the effective optical region will be described specifically using FIG. 4A and FIG. 4B. FIG. 4A and FIG. 4B are figures illustrating the configuration of one embodiment of the EC element of the present invention schematically. FIG. 4A is a front view, and FIG. 4B is a sectional view at the B-B' position in FIG. 4A.

When voltage is impressed on the EC element from an unillustrated external circuit, EC compounds change light absorption characteristics thereof in the wavelength regions depending on materials. The EC compounds are colored/bleached in the visible light region typically. A region in which the EC layer 6 is retained, and the transmittance change occurs according to impressed voltage is called a transmittance variable region. That is, in FIG. 4A and FIG. 4B, the region 31 of an internal EC layer 6 surrounded by the sealing material 3 is a transmittance variable region. Although the electrodes 2a and 2b are formed in the front of the substrates 1a and 1b in the EC element of FIG. 4A and FIG. 4B, the sealing material 3 is disposed inside the peripheries of the electrodes 2a and 2b, and the EC layer 6 is disposed, the present invention is not limited to this. The transmittance variable region 31 is a region where the first electrode 2a, the second electrode 2b and the EC layer 6 are overlapped mutually.

The effective optical region 32 is included by the transmittance variable region 31 in the EC element of the present invention. Moreover, the shortest distance from the periphery of the effective optical region 32 to a periphery of a transmittance variable region 31 is d, and the length of the transmittance variable region 31 on a straight line including the shortest distance is L in one direction in the plane of the effective optical region 32. In the present invention, the effective optical region 32 is set so that the d is 7.5% or more and 15% or less of the L ($0.075 \leq d/L \leq 0.15$) at both ends in the above-mentioned one direction. A straight line including the shortest distance on one end side in the above-mentioned one direction and a straight line including the shortest distance on the other end side do not need to be continuous necessarily. In FIG. 4A and FIG. 4B, the shortest distances d1 and d2 from the periphery of the effective optical region 32 to the periphery of the transmittance variable region 31 are 7.5% or more and 15% or less of the length L1 of the transmittance variable region 31 on the straight line including the shortest distances d1 and d2 in the vertical direction on the paper.

As illustrated in FIG. 2, when the EC element is stood so that the electrode surfaces are parallel to the vertical direction, the absolute value K of the gradient of d($\Delta$OD) increases greatly in the regions within 7.5% or more from the upper and lower ends of the transmittance variable region 31 (EC layer 6), and vertical color separation is recognized strongly. In the inside region except the regions within 7.5%, change in the K is slight, and vertical color separation is hardly recognized. Therefore, the influence of vertical color separation can be sharply reduced by excluding the regions within 7.5% or more from the effective optical region. It is preferable that the regions within 15% or more be excluded.

Meanwhile, the K scarcely change in the inside region except the regions within 25% from the upper and lower ends of the transmittance variable region 31. Since more increase in the region excluded from the effective optical region 32 of the transmittance variable region 31 than required causes increase in electric power due to increase in the area of the whole EC element, especially increase in the EC layer 6, increase in cost due to the expansion of EC element size, increase in difficulty in disposition, and the like, the increase in the region is not preferable. Therefore, the regions excluded from the effective optical region 32 of the transmittance variable region 31 is the regions within 25% or less from the upper and lower ends of the transmittance variable region 31.

As mentioned above, it is the vertical direction in which vertical color separation occurs. Therefore, a direction which satisfies the above-mentioned $0.075 \leq d/L \leq 0.25$ is preferably the vertical direction in the use environment of the EC element to avoid the influence of vertical color separation effectively.

Meanwhile, various components which can affect the EC compounds may enter from the sealing material 3 surrounding the EC layer 6 and the outside of the sealing material 3. The effective optical region 32 is preferably set at a position a predetermined distance away from the periphery of the transmittance variable region 31 to avoid such influence. Therefore, even though a direction which satisfies the above-mentioned $0.075 \leq d/L \leq 0.25$ is a horizontal direction in the use environment of the EC element, the direction is effective. In FIG. 4A, the shortest distances d3 and d4 from the periphery of the effective optical region 32 to the periphery of the transmittance variable region 31 is specifically 7.5% or more and 25% or less of the length of the transmittance variable region 31 including the shortest distances L2 in the horizontal direction on the paper.

The imaging apparatus may be used with the imaging apparatus rotated at 90° in an electrode plane depending on objects to be imaged. Therefore, it is preferable to satisfy $0.075 \leq d/L \leq 0.25$ on all the periphery of the effective optical region 32 in the present invention.

Figure 5:
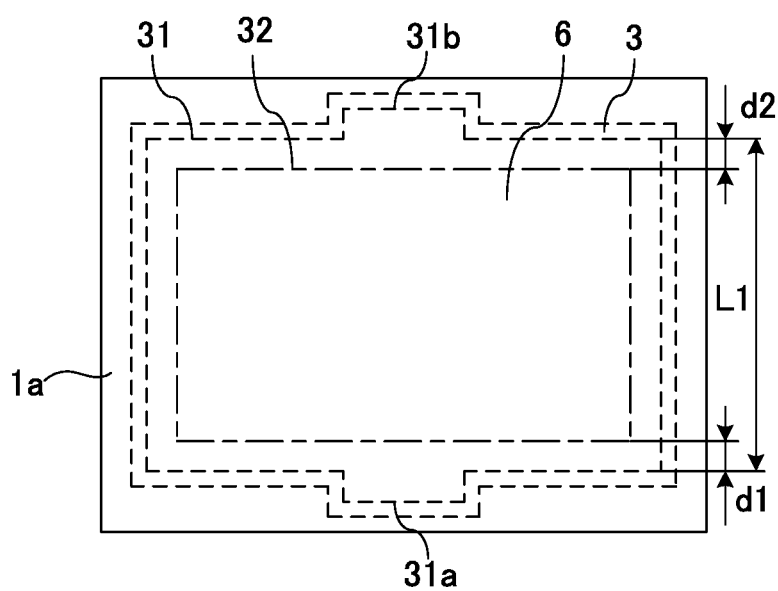
FIG. 5 is a figure illustrating the configuration of another embodiment of the EC element of the present invention schematically.

Although FIG. 4A illustrates an aspect in which both effective optical region 32 and transmittance variable region 31 are rectangles and have similar figures, as illustrated in FIG. 5, the aspect may be an aspect in which the periphery of the transmittance variable region 31 has projection parts 31a and 31b projecting outside. In such a case, the shortest distances d1 and d2 are defined in the region except the projection parts 31a and 31b. In FIG. 5, the illustration of bus bars 4a and 5a is omitted for convenience.

In FIG. 4A and FIG. 4B, although the shortest distances d1 and d2 from the periphery of the effective optical region 32 to the periphery of the transmittance variable region 31 is set mutually equal to a preferable aspect in the vertical direction on the paper, the present invention is not limited to such a configuration. Similarly, in FIG. 4A, although the shortest distances d3 and d4 from the periphery of the effective optical region 32 to the periphery of transmittance variable region 31 is set mutually equal as a preferable aspect in the horizontal direction on the paper, the present invention is not limited to such a configuration. In FIG. 4A, although an aspect in which the effective optical region 32 is a rectangle is illustrated, the shape of the effective optical region 32 is not limited, but may be another quadrangle such as a square; a polygon other than a quadrangle; a circle; or an ellipse in the present invention. When the effective optical region 32 is a quadrangle, a direction which satisfies the above-mentioned $0.075 \leq d/L \leq 0.25$ is a direction parallel to one side of the quadrangle. When the effective optical region 32 is a circle or an ellipse, a direction which satisfies the above-mentioned $0.075 \leq d/L \leq 0.25$ is a direction parallel to a tangent which touches one point of the periphery. The "periphery" of the transmittance variable region and the "periphery" of the effective optical region represent the "edge" of each region, and can be translated into as an "end", an "outline" or the like herein.

In FIG. 4A and FIG. 4B, reference numerals 4a, 4b, 5a and 5b are bus bars. When the electrodes 2a and 2b are transparent electrodes, the electrodes 2a and 2b may cause a voltage drop in an in-plane direction due to the resistance of a transparent electroconductive material and cause color separation. Therefore, it is preferable to dispose bus bars along the periphery of the electrodes 2a and 2b to reduce the influence thereof. When the effective optical region 32 is a rectangle or a square as illustrated in FIG. 4A, one of the bus bars 4a, 4b, 5a and 5b is provided along each of the two horizontally parallel opposite sides of each of the first electrode 2a and the second electrode 2b. In other words, two upper and lower bus bars are disposed on each of the electrodes 2a and 2b. Both of the two upper and lower bus bars on each of the electrodes 2a and 2b are energized. Such an electric supply method is known as a 4-terminal electric supply method. When the effective optical region 32 is a circle or an ellipse, two upper and lower bus bars may be provided to be opposed in the vertical direction with the effective optical region 32 between the two bus bars along the periphery of the effective optical region 32.

As mentioned above, since the effective optical region 32 is set at a position a predetermined distance away from the periphery of the transmittance variable region 31, the influence of vertical color separation is reduced in effective optical region 32 in the EC element of the present invention. Therefore, since the influence of vertical color separation can be suppressed without increasing the viscosity of the EC layer 6 markedly, vertical color separation can be suppressed while decrease in element responsiveness is suppressed. Vertical color separation can also be further suppressed by increasing the viscosity of the EC layer 6 moderately, vertical color separation can also be still further suppressed while element responsiveness is secured. When an apparatus such as an imaging apparatus or a transmittance variable window includes the EC element of the present invention, the transmittance variable region 31 may be set so that the effective optical region 32 of the EC element of the present invention corresponds to a region which needs a light control function in the apparatus.

Figure 6A:
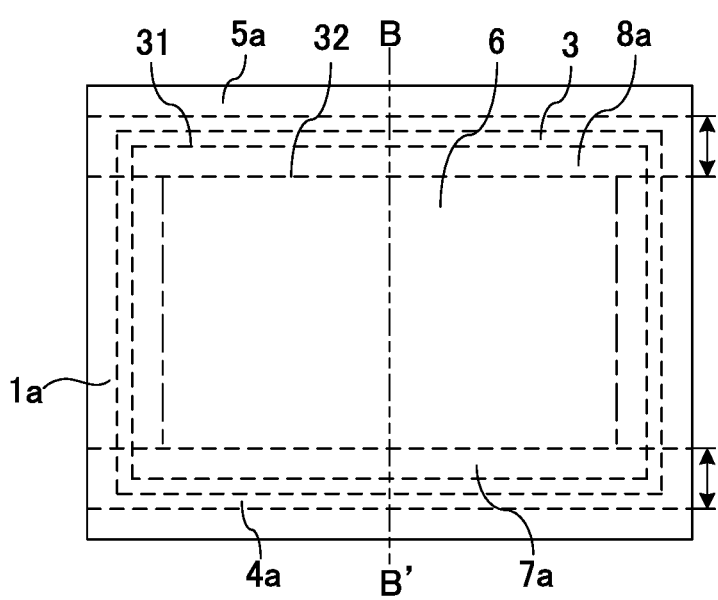
FIG. 6A is a figure illustrating the configuration of another embodiment of the EC element of the present invention schematically.
Figure 6B:
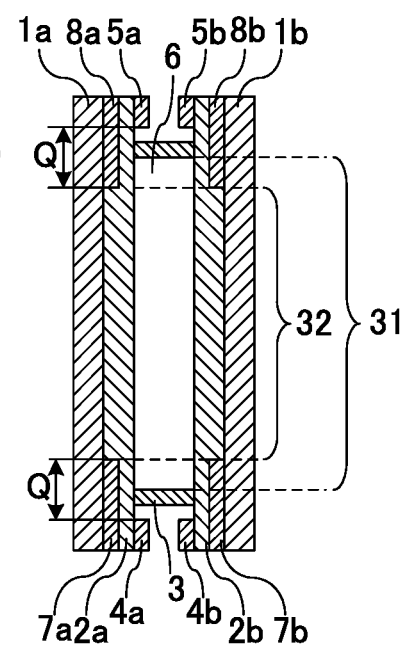
FIG. 6B is another figure illustrating the configuration of another embodiment of the EC element of the present invention schematically.

In the present invention, a region which satisfies the above-mentioned $0.075 \leq d/L \leq 0.25$ may be covered with a shield part. A shield part is preferably formed along the periphery of the effective optical region 32. Specific examples of such a shield part include bus bars 4a, 4b, 5a and 5b in FIG. 4A and FIG. 4B extending to the periphery of the effective optical region 32, and metal wiring 7a, 8a, 7b and 8b which is electroconductive to each of the electrode 2a and the electrode 2b as illustrated in FIG. 6A and FIG. 6B. The shield part is especially preferably metal wiring. FIG. 6A is a front view, and FIG. 6B is a sectional view at C-C' in FIG. 6A. Since the EC element is a current drive element, current increases with increase in the electrode area. The voltage drop due to electrode resistance accompanying this current increase, especially the resistance of a transparent electrode may lead to the transmittance inhomogeneity in the EC element. The electrodes 2a and 2b dare to be expanded, the EC element of the present invention is designed, and the end regions thereof are excluded from the effective optical region and are not used. The influence of vertical color separation is reduced thereby. In the apparatus using the EC element, this region outside the effective optical region does not affect an optical mechanism. Therefore, it is preferable to dispose metal wiring 7a, 8a, 7b and 8b to reduce a voltage drop due to the resistance of a transparent electrode in such a region.

The metal wiring 7a, 7b, 8a and 8b is not particularly limited. However, when the metal wiring is provided in the side in contact with the EC layer 6, an electrochemically stable metal is preferably used similarly to the electrodes 2a and 2b. Since the metal wiring 7a, 7b, 8a and 8b is disposed between the electrodes 2a and 2b and the substrates 1a and 1b, and metal wiring 7a, 7b, 8a and 8b does not come in contact with the EC layer 6 directly in FIG. 6A and FIG. 6B, a metal can be selected without adhering to electrochemical stability.

The resistance of a conductor having three-dimensional conductivity is generally expressed by the following expression (I).

$$R = \rho(Q/A) = \rho(Q/Wt) \qquad (I)$$

(R: resistance, $\rho$: resistivity of conductor, Q: length of conductor, A: cross-sectional area of conductor, W: width of conductor, t: thickness of conductor)

Here, an EC element in which the driving current density is I, the length in the direction of a power supply terminal is Q, and the width is a unit width (width=1) is assumed. Since the voltage drop at this time is given by the product of the resistance of an electrode and current, the voltage drop is expressed by the following expression (II).

$$\Delta V = IQR = (I\rho Q^2)/t \qquad (II)$$

Figure 7:
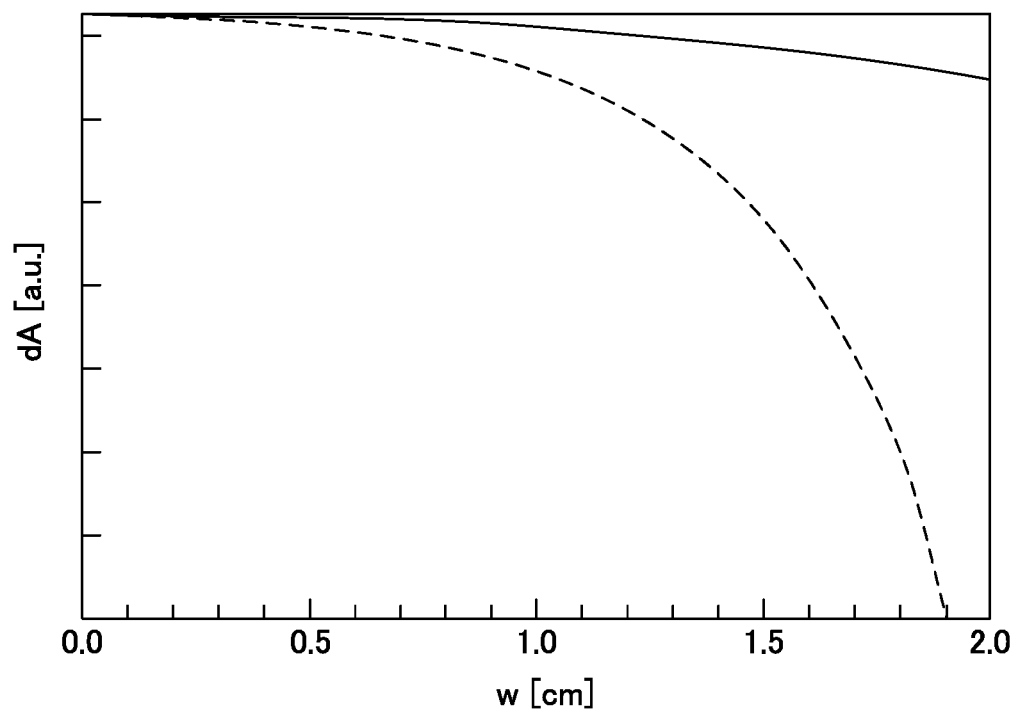
FIG. 7 is a figure illustrating the relationship between the length of metal wiring and decrease in the absorbance of an EC layer due to a voltage drop in the EC element of FIG. 6A and FIG. 6B.

FIG. 7 illustrates the relationship between the length of metal wiring Q and the absorbance decrease dA of the EC layer due to a voltage drop. The length of the metal wiring Q is the distance from the edges of the bus bars 4a, 4b, 5a and 5b to the ends of metal wiring 7a, 7b, 8a and 8b, respectively in the vertical direction on the paper in FIG. 6A and FIG. 6B. Parameters used here are as follows:

$I = 5.5$ mA/cm$^2$

Electrode: $\rho = 8.1 \times 10^{-4}$ $\Omega$cm, $t = 900$ nm

Metal wiring: $\rho = 5 \times 10^{-5}$ $\Omega$cm, $t = 200$ nm

It is found from here that an EC element in which metal wiring 7a, 7b, 8a and 8b is disposed in the region outside the effective optical region 32 has slighter decrease in absorbance accompanying increase in the distance from the ends of the bus bars 4a, 4b, 5a and 5b than an EC element in which metal wiring is not disposed. This means that the EC element in which metal wiring 7a, 7b, 8a and 8b is disposed outside the effective optical region 32 has slighter difference in transmittance between the ends and the center. It can be confirmed from here that the influence of a voltage drop due to the resistance of the transparent electrode can be effectively suppressed by disposing metal wiring 7a, 7b, 8a and 8b outside the effective optical region 32.

<Method for Evaluating the Degree of Vertical Color Separation>

Figure 8:
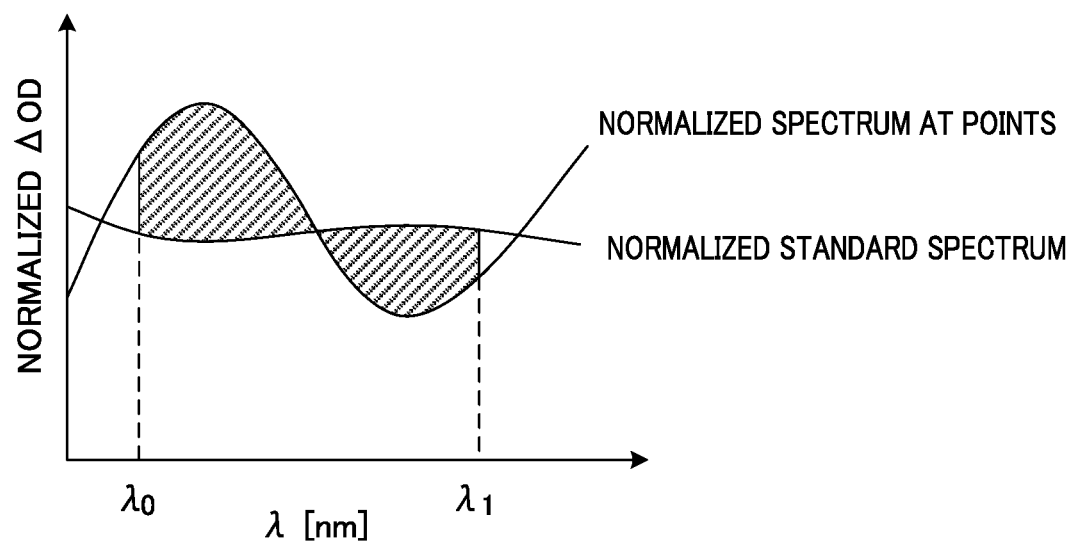
FIG. 8 is a figure for describing a method for evaluating the degree of the vertical color separation of the EC element.

A method for evaluating the degree of vertical color separation will be described with reference to FIG. 8.

In a transmission type EC element, light was transmitted through a driven EC element, and the spectra of the transmitted light were measured two-dimensionally in the element plane of the EC element, namely at a plurality of points of the element plane of the EC element. When this measurement of the spectra of the transmitted light was performed over time, it was found that the average spectrum obtained by equalizing spectra at the plurality of points in the element plane of the EC element at each time did not depend on time (did not depend on the elapse of time), but hardly changed. Then, the degree of vertical color separation was evaluated based on the differences of the spectra at the plurality of points in the plane from the standard spectrum using the average spectrum of the plurality of points in this plane as a standard spectrum in the present invention.

First, both of the standard spectrum and the spectra at the plurality of points in the plane were specifically normalized to remove the influence due to the concentration inhomogeneity of the EC compounds in an in-plane direction of the element in the EC layer 6. The normalization was performed so that the amount of average optical density change ($\Delta$OD) was 1 in a predetermined wavelength range (here 425 nm to 700 nm). The difference of each of these normalized spectra at the plurality of points in the plane from the normalized standard spectrum was defined as $D(\lambda)$, and the value of $d(\Delta OD)$ was calculated from the following expression (III).

$$d(\Delta OD) = \sqrt{\frac{1}{\lambda_1 - \lambda_0} \int_{\lambda_0}^{\lambda_1} (D(\lambda))^2 d\lambda} \qquad (III)$$

Here, in expression (III), $\lambda_0$ represents the minimum of the wavelength range of target light (nm), and $\lambda_1$ represents the maximum of the wavelength range of the target light. The value of this $d(\Delta OD)$ represents the average deviation width of the spectrum at each point of the plurality of points in the plane from the standard spectrum as mentioned above. It is shown that as this value becomes larger, the spectrum of the transmitted light at the point deviates from the standard spectrum more. In the present invention, the above-mentioned $d(\Delta OD)$ of each point of the spectra at the plurality of points in the plane was calculated and used for evaluation.

Examples of the use of the EC element of the present invention include an imaging apparatus, a display, a reflectance variable mirror and a variable transmittance window. When vertical color separation occurs in these uses, the balance of the color of transmitted light or reflected light will change unintentionally at the top and bottom of the EC element plane. This is not preferable in any use. When color change between adjacent regions in the plane is great, color inhomogeneity is recognized further.

The case where the EC element is used as an optical filter, especially ND (Neutral Density) filter, of an imaging apparatus as an example as to the value of $d(\Delta OD)$ is considered. When vertical color separation occurs in the EC element used as an ND filter, the tint changes at the top and bottom of an image which is imaged and obtained. When the EC compounds are colored by the drive of EC element, the color of a cathodic EC compound (typically green or blue) specifically appears strongly typically at the bottom of the image (the top as the EC element). The color of an anodic EC compound (typically red or yellow) comes to appear strongly at the top of the image (the bottom as the EC element). Therefore, when the degree of vertical color separation is large, the grade of the acquired image decreases markedly.

When the EC element is used for the use of an optical filter or the like in this way, it is required that the degree of vertical color separation be suppressed. From the sensory evaluation of an image, when the average value of d(ΔOD) at points in the plane in the effective optical region 32 can be specifically 0.01 or less, the grade of an acquired image can be maintained in even the case where the EC element is used as an optical filter. Therefore, for example, the cases where the faces of persons look blue at the bottom of the screen, and an image of the sky is purplish at the top of the screen can be suppressed. When the average value of the d(ΔOD) in the effective optical region 32 can be 0.001 or less, the grade of the acquired image can be maintained high. Therefore, the EC element can be used as a variable optical filter also in a model for which higher color reproducibility is required.

<Concentration of EC Compounds>

Figure 9:
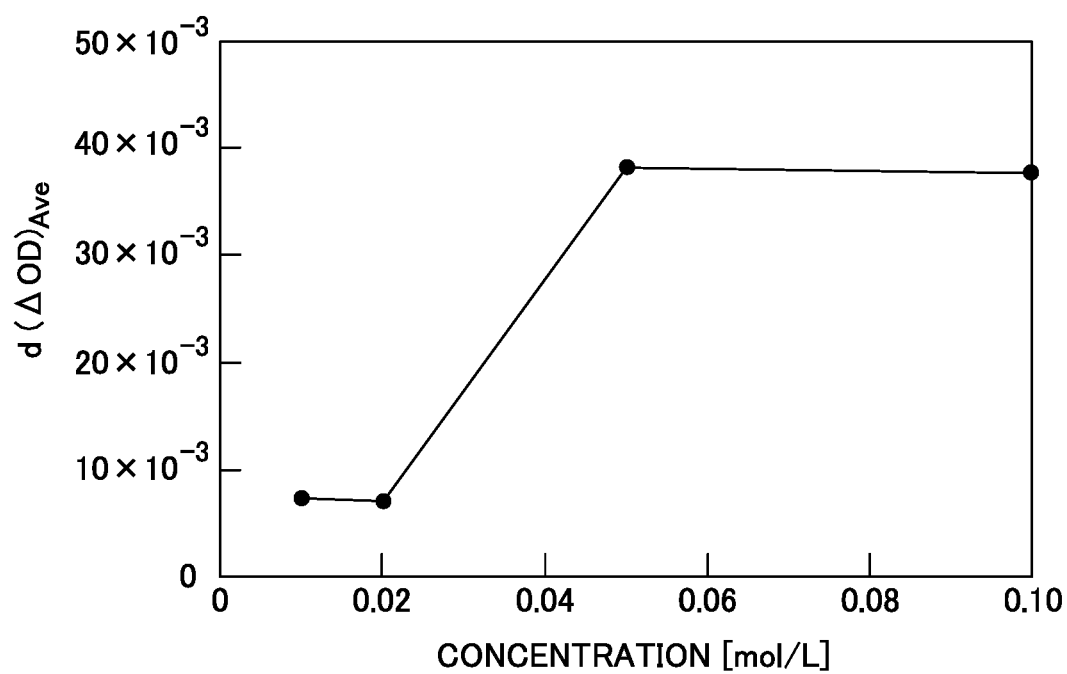
FIG. 9 is a graph illustrating the relationship between the concentration of EC compounds and the degree of vertical color separation.

FIG. 9 is a graph illustrating the relationship between the concentration of an anodic EC compound and a cathodic EC compound (mol/L) and the average value of d(ΔOD) at a plurality of points in the plane (d(ΔOD)Ave). FIG. 9 illustrates a graph as to an EC element using a solution in which the compound (2) as an anodic EC compound and the compound (3) as a cathodic EC compound are dissolved in propylene carbonate as the EC layer 6 in the configuration of FIG. 4A and FIG. 4B. In FIG. 9, the axis of abscissas of the graph illustrates the concentration of each of the anodic EC compound and the cathodic EC compound (mol/L), and the axis of ordinates of the graph illustrates the above-mentioned degree of the average of vertical color separation.

It is found from FIG. 9 that vertical color separation occurs markedly when the concentrations of the anodic EC compound and the cathodic EC compound are 0.05 mol/L or more. As mentioned above, it is considered that one of the causes of vertical color separation is that when the EC element is driven, the affinity of the EC compounds for the solvent decrease, and the EC compounds form aggregates. The concentrations of the components which form the aggregates have strong influence on the formation of the aggregates. It is specifically considered that the aggregates are more easily formed as the concentrations of the components which form the aggregates are higher, and the formation of the aggregates proceeds rapidly when the concentrations exceed a value. Here, it is considered that the degree of the formation of the aggregates became high, and vertical color separation appeared strongly in the region in which the concentrations of the EC compounds in the EC layer 6 were 0.05 mol/L or more.

When the concentrations of the EC compounds in the EC layer 6 are increased in an EC element, the amount of optical characteristic change when the EC element is driven and is not driven is easily increased. However, the aggregates are easily formed when the concentrations of the EC compounds in the EC layer 6 are increased as mentioned above. Therefore, vertical color separation easily occurs. However, since the influence of vertical color separation can be suppressed according to the present invention, the concentrations of the anodic EC compound and the cathodic EC compound can be increased to 0.05 mol/L or more.

<Method for Driving EC Element>

Although the driving unit of the EC element according to the present embodiment is not particularly limited, a unit for controlling the transmittance of the EC element by pulse width modulation is used preferably. Examples include a technique for controlling the transmittance of the EC element by maintaining the transmittance of the EC element without changing the peak value of a pulse voltage waveform and changing the ratio of the impression period of impressed voltage to one cycle of the pulse voltage waveform.

The ratio of the voltage impression period to one cycle at this time is defined as a Duty ratio. When the Duty ratio of pulse drive is maintained, the coloring of EC materials increases in the impression period of voltage, and the coloring of EC materials decreases in an idle period. When the EC element is driven with the Duty ratio fixed at a steady voltage of a drive power supply, the change in absorbance is saturated through a transient state, and the saturated absorbance is maintained. To decrease absorbance, the Duty ratio may be fixed to a lower Duty ratio than the immediately preceding Duty ratio. To increase absorbance, the Duty ratio may be fixed to a higher Duty ratio than the immediately preceding Duty ratio. When one cycle of a control signal is long at this time, the increase and decrease in an absorbance change may be visually recognized. Therefore, one cycle is preferably 100 milliseconds or less, and more preferably 10 milliseconds or less.

[Imaging Apparatus]

Figure 10A:
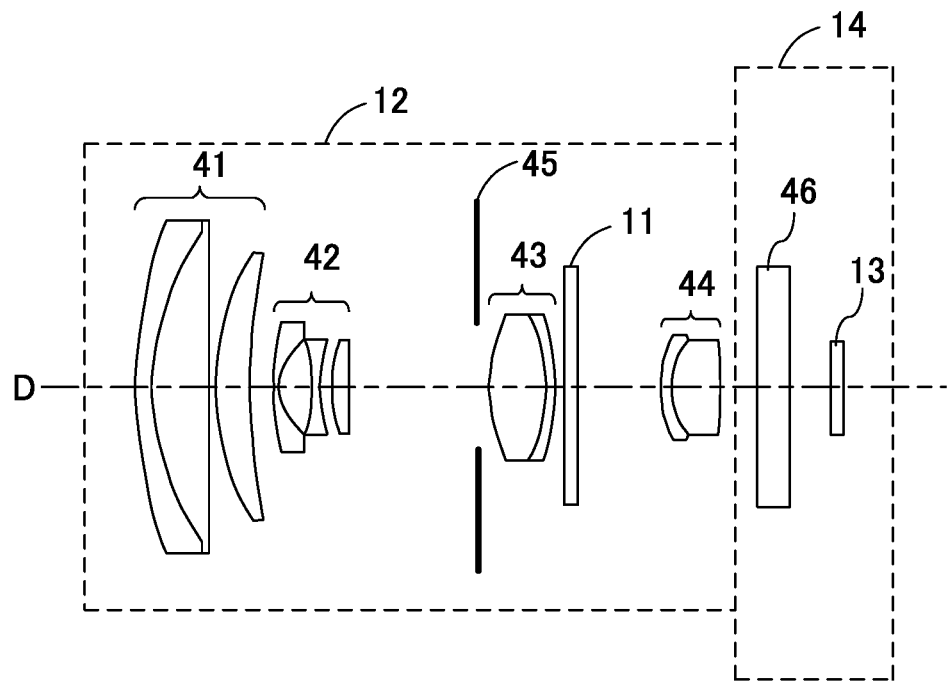
FIG. 10A is a figure illustrating the configuration of an embodiment of an imaging apparatus using the EC element of the present invention schematically.
Figure 10B:
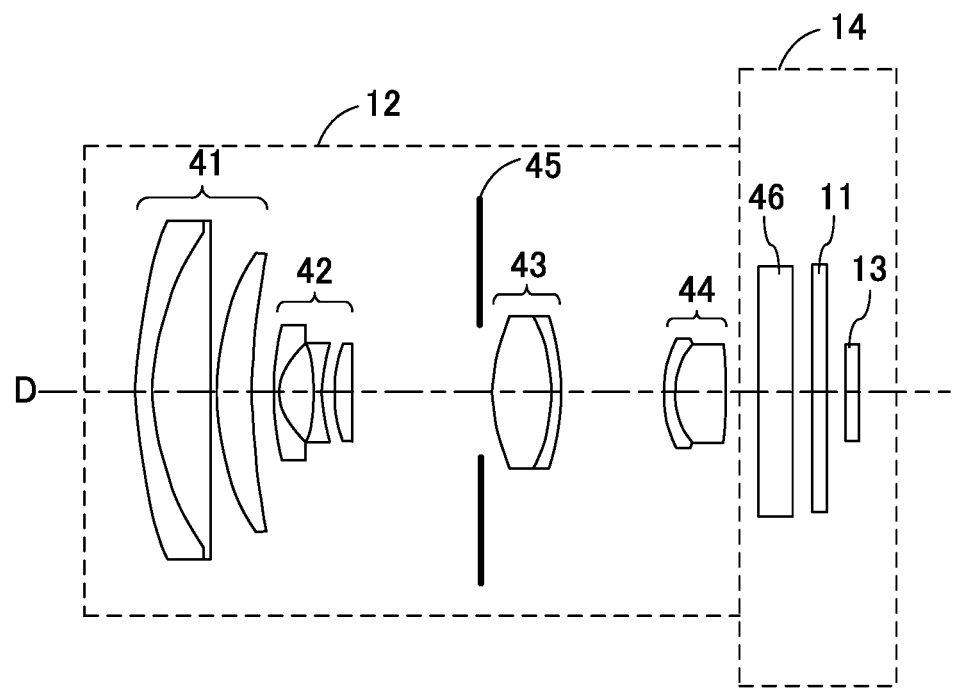
FIG. 10B is another figure illustrating the configuration of an embodiment of the imaging apparatus using the EC element of the present invention schematically.

An EC element of the present invention is used preferably as the optical filter of an imaging apparatus. FIG. 10A and FIG. 10B are sectional views illustrating the configurations of embodiments of imaging apparatuses using the EC element schematically. The imaging apparatuses of FIG. 10A and FIG. 10B have a lens unit 12 and an imaging unit 14, which are mutually connected detachably through an unillustrated mounting member. The lens unit 12 is a unit having a plurality of lens groups 41 to 44. The lens unit 12 represents zoom lenses of the rear focus type, which performs focusing behind a diaphragm. The lens unit 12 has four lens groups which are a first lens group 41 having positive refractive capability, a second lens group 42 having negative refractive capability, a third lens group 43 having positive refractive capability and a fourth lens group 44 having positive refractive capability sequentially from a subject (not illustrated) side on the left side on the paper. Magnification is changed by changing the interval between the second lens group 42 and the third lens group 43, and focusing is performed by moving some lens groups of the fourth lens group 44.

The lens unit 12 has, for example, an aperture diaphragm 45 between the second lens group 42 and the third lens group 43. In the aspect of FIG. 10A, the lens unit 12 has the EC element 11 of the present invention as an optical filter between the third lens group 43 and the fourth lens group 44. The lens unit 12 is configured so that light having passed through the lens unit 12 passes each of the lens groups 41 to 44, the aperture diaphragm 45 and the EC element 11 of the present invention, and the amount of light can be adjusted using the aperture diaphragm 45 and the EC element 11 of the present invention. D in the figure is an optical axis.

The configuration in the lens unit 12 can be changed appropriately. For example, the EC element 11 of the present invention can be disposed in front of the aperture diaphragm 45 (subject side) or behind the aperture diaphragm 45 (imaging unit 14 side). The EC element 11 may be disposed in front of the first lens group 41 or behind the fourth lens group 44. When the EC element 11 is disposed at the position at which light converges, the apparatus has the advantage such as being able to reduce the area of the EC element 11 of the present invention. The aspect of the lens unit 12 can be selected appropriately, and may be an inner focus type, which performs focusing in front of the aperture diaphragm 45 besides a rear focus type, or may be another type. A special lens such as a fisheye lens or a macro lens can be selected appropriately besides a zoom lens.

A glass block 46 which the imaging unit 14 has is a glass block such as a low-pass filter, a faceplate, and a colored filter. An imaging element 13 is a sensor part which receives light having passed through the lens unit 12, and CCD, CMOS or the like can be used. The imaging element 13 may be a photosensor such as a photodiode, and an imaging element which acquires and outputs the intensity of light or information on a wavelength can be used appropriately.

As illustrated in FIG. 10A, when the EC element 11 of the present invention is incorporated in the lens unit 12, a driving unit may be disposed in the lens unit 12, or may be disposed out of the lens unit 12. As illustrated in FIG. 10B, when EC element 11 of the present invention is incorporated in the imaging unit 14, a driving unit may be disposed in the imaging unit 14, or may be disposed out of the imaging unit 14. When the EC element 11 is provided in the imaging unit 14, the EC element 11 may be disposed so that the imaging element 13 receives light having passed through the EC element 11 of the present invention. For example, as illustrated in FIG. 10B, the EC element 11 may be disposed just in front of the imaging element 13.

The imaging apparatus of the present invention can be applied to a product which has the combination of light amount adjustment and an imaging element. The imaging apparatus can be used, for example, for cameras, digital cameras, video cameras, and digital video cameras, and can also be applied to products such as mobile phones, smart phones, PCs and tablets into which imaging apparatuses are incorporated. In these imaging apparatuses, using the EC element 11 of the present invention as a light control member enables the amount of light controlled to be variable appropriately with one filter, and the EC element 11 has advantages such as the reduction of the number of members and saving space.

[Transmittance Variable Window]

Figure 11A:
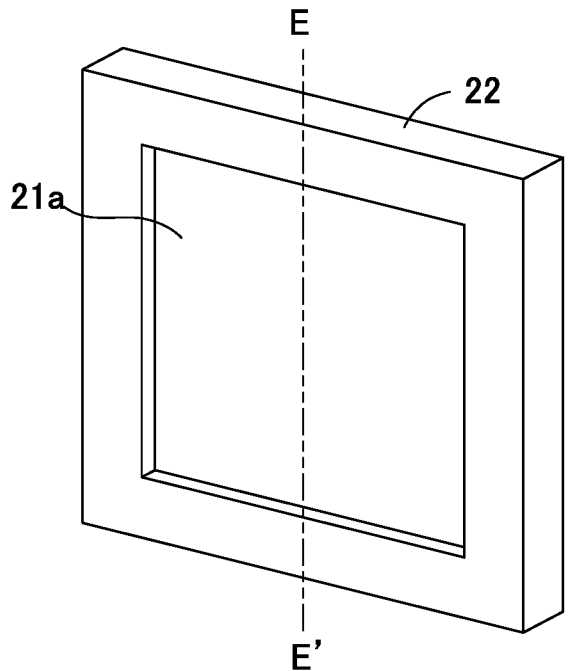
FIG. 11A is a figure illustrating the configuration of an embodiment of a transmittance variable window using the EC element of the present invention schematically.
Figure 11B:
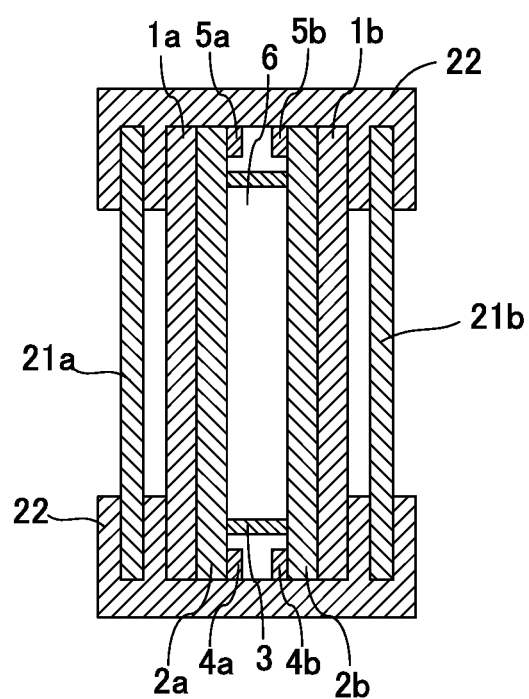
FIG. 11B is another figure illustrating the configuration of an embodiment of the transmittance variable window using the EC element of the present invention schematically.

FIG. 11A and FIG. 11B illustrate the configuration of one embodiment of a transmittance variable window using an EC element of the present invention schematically. FIG. 11A is a perspective view, and FIG. 11B is a sectional view at the E-E position in FIG. 11A.

The transmittance variable window of the present invention has a pair of transparent protective substrates 21a and 21b, an EC element 11 of the present invention, and a window frame 22. The peripheral edges of the transparent protective substrates 21a and 21b and the EC element 11 are fitted into the window frame 22 and fixed. An unillustrated driving unit may be integrated in the window frame 22 and may be disposed out of the window frame 22 and be connected with the EC element 11 through wiring.

As long as the transparent protective substrates 21a and 21b are a material having high light transmittance, the transparent protective substrates 21a and 21b are not particularly limited. It is preferable that the transparent protective substrates 21a and 21b be a glass material in view of use as a window. In FIG. 11A and FIG. 11B, although the EC element 11 is a separate constituent member from the transparent protective substrates 21a and 21b, for example, the substrates 1a and 1b of EC element 11 may serve as transparent protective substrates.

Regardless of material, the window frame 22 is configured so that the opening of the window frame 22 corresponds to the effective optical region of the EC element 11.

The transmittance variable window of the present invention can be applied, for example, to use in which the amount of the incidence of sunlight to the inside of a room in the daytime is adjusted. Since the transmittance variable window can also be applied to the adjustment of the amount of heat besides the amount of sunlight, the transmittance variable window can be used for controlling indoor brightness or temperature. The transmittance variable window can also be applied to use in which a view from the outside of a room to the inside of the room is shut out as a shutter. Such a light control window can also be applied to the windows of transport such as cars, trains, airplanes and ships; and the filters of the display surfaces of clocks and mobile phones besides glass windows for buildings.

EXAMPLES

Although the present invention will be described further specifically by Examples, the present invention is not limited to these examples.

(EC Compounds)

The compound (2) was synthesized as an anodic EC compound with reference to U.S. Pat. No. 6,020,987. The compound (3) was synthesized as a cathodic EC compound by the following method.

First, 9,9-dimethyl-2,7-diazafluorene which is an intermediate was synthesized in the following procedure with reference to a technical literature (E. Botana, et al., Angew. Chem. Int. Ed. 46, 198-201(2007)).

[Formula 4]

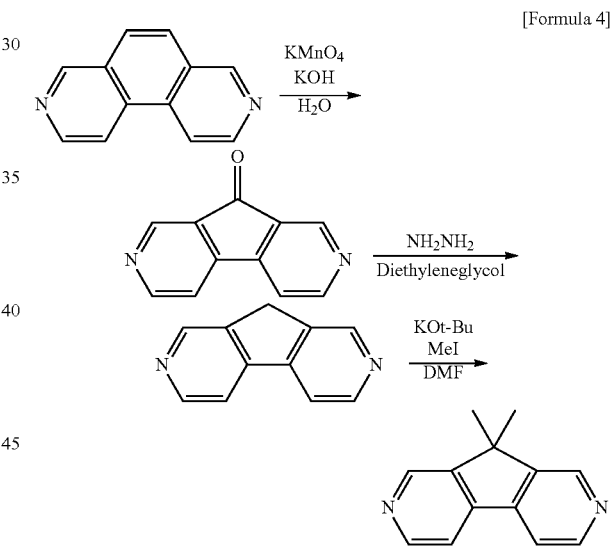

Then, 3,8-phenanthroline, potassium hydroxide and water were added to a reaction vessel and heated at 90° C. Then, a solution obtained by mixing water and potassium permanganate and heating at 90° C. was dropped into the reaction solution. The mixture was reacted for 1 hour, and the deposited solid was then filtered, followed by extraction with chloroform, and the extract was washed with water and a saturated salt solution, dried and concentrated to obtain a brown powder. This was separated and purified by silica gel chromatography to obtain a first intermediate which is a yellow solid.

The first intermediate, diethylene glycol and hydrazine monohydrate were added to the reaction vessel and reacted at 100° C. for 12 hours. Water was added to the obtained blackish red suspension, followed by extraction with dichloromethane, and the extract was washed with water and a saturated salt solution, dried and concentrated to obtain a blackish yellow solid. This was separated and purified by silica gel chromatography to obtain a second intermediate which is a yellowish brown solid.

The second intermediate and dimethylformamide (DMF) were added to the reaction vessel and cooled in an ice bath. Then, potassium tert-butoxide was added, and the mixture was stirred at the same temperature for 30 minutes, followed by dropping iodomethane diluted with DMF. The mixture was further stirred at the same temperature for 30 minutes and then reacted at a room temperature for 3 hours. The obtained reddish brown suspension was added to a saturated sodium bicarbonate solution, followed by extraction with ethyl acetate, and the extract was washed with water and a saturated salt solution, dried and concentrated to obtain a blackish yellow solid. This was separated and purified by silica gel chromatography to obtain 9,9-dimethyl-2,7-diazafluorene which is a beige solid.

Next, a compound (3) was synthesized in the following procedure using 9,9-dimethyl-2,7-diazafluorene.

[Formula 5]

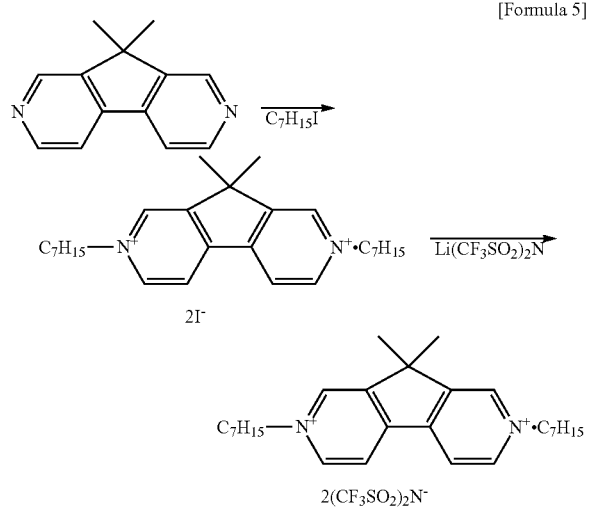

Then, 9,9-dimethyl-2,7-diazafluorene and an excessive amount of 1-iodoheptane were added to the reaction vessel and reacted for 19 hours at 110° C. using DMF as a solvent. A deposit was collected and dissolved in water, and bis(trifluoromethanesulfonyl)imide lithium was added excessively. A deposit was filtered, collected and dried to obtain the compound (3).

(Manufacturing of EC Element)

An EC element having the structure illustrated in FIG. 1A and FIG. 1B was manufactured by the following method.

Two glass substrates (substrates 1a and 1b) with the indium-doped tin oxide (ITO) films (electrodes 2a and 2b) formed on the surface were provided and disposed so that the ITO films were opposed. The peripheries of the two glass substrates were adhered with a part open as an injection port using a sealing material 3 in which a spacer bead having a particle size of 50 µm was mixed. The compound (2) which is an anodic EC compound and the compound (3) which is a cathodic EC compound were each dissolved in propylene carbonate at a concentration of 0.1 mol/L. The solution was filled into a space formed by the two sheets of electrodes 2a and 2b and the sealing material 3 by injecting this solution from the above-mentioned injection port. Then, the above-mentioned injection port was sealed with the sealing material 3 to obtain the EC element of Example 1. The range of a transmittance variable region 31 of this EC element was a rectangle measuring 20 mm×15 mm, an effective optical region 32 was a rectangle measuring 18 mm×10.1 mm, and the effective optical region 32 was disposed at the central position of the transmittance variable region 31 vertically and horizontally. In the direction of a short side, d1/L1=d2/L2=0.165.

An EC element in which both transmittance variable region 31 and effective optical region 32 were rectangles measuring 18 mm×10.1 mm was manufactured as Comparative Example 1.

(Evaluation of Vertical Color Separation)

The above-mentioned EC elements of Example 1 and Comparative Example 1 were combined with an automatic XZ stage so that the long side was in the horizontal direction, and the short side was in the vertical direction. The transmission spectrum was measured at a plurality of points in the effective optical region 32 of the EC element using a spectrum measuring apparatus obtained by combining a light source, optical fibers, lenses and a spectroscope. The average spectrum of all points of the plurality of measured points was used as a standard spectrum, and the difference of a spectrum at each point was evaluated using the above-mentioned d(ΔOD).

Electrodes 2a and 2b were energized through bus bars 4a, 4b, 5a and 5b, and the impressed voltage was a value obtained by adding 0.15 V as excess voltage to the difference between the half-wave potential of an anodic EC material and the half-wave potential of a cathodic EC compound (0.886 V).

The half-wave potential of EC compounds was measured by performing cyclic voltammetry in a nitrogen atmosphere at 25° C. using an ITO electrode as a working electrode, a platinum wire as a counter electrode, and Ag/Ag$^+$ (PC, PF$_6$) as a reference electrode. At this time, propylene carbonate was used as a solvent, 0.1M hexafluoro phosphate tetrabutylammonium was used as a supporting electrolyte, the concentrations of the EC compounds were 0.001 mol/L, and the sweep rate was 0.1 Vs$^{-1}$.

(Evaluation Result)

When the simulation at the time of using the EC elements of Example 1 and Comparative Example 1 as the ND filter of an imaging apparatus was performed from the in-plane transmittance profiles of the EC elements of Example 1 and Comparative Example 1, it was found that the EC element of Example 1 has clearly higher homogeneity of the RGB image. It was found that the homogeneity of colors was improved more greatly in Example 1 than in Comparative Example 1 also from the signal distributions of R, G and B.

Figure 12:
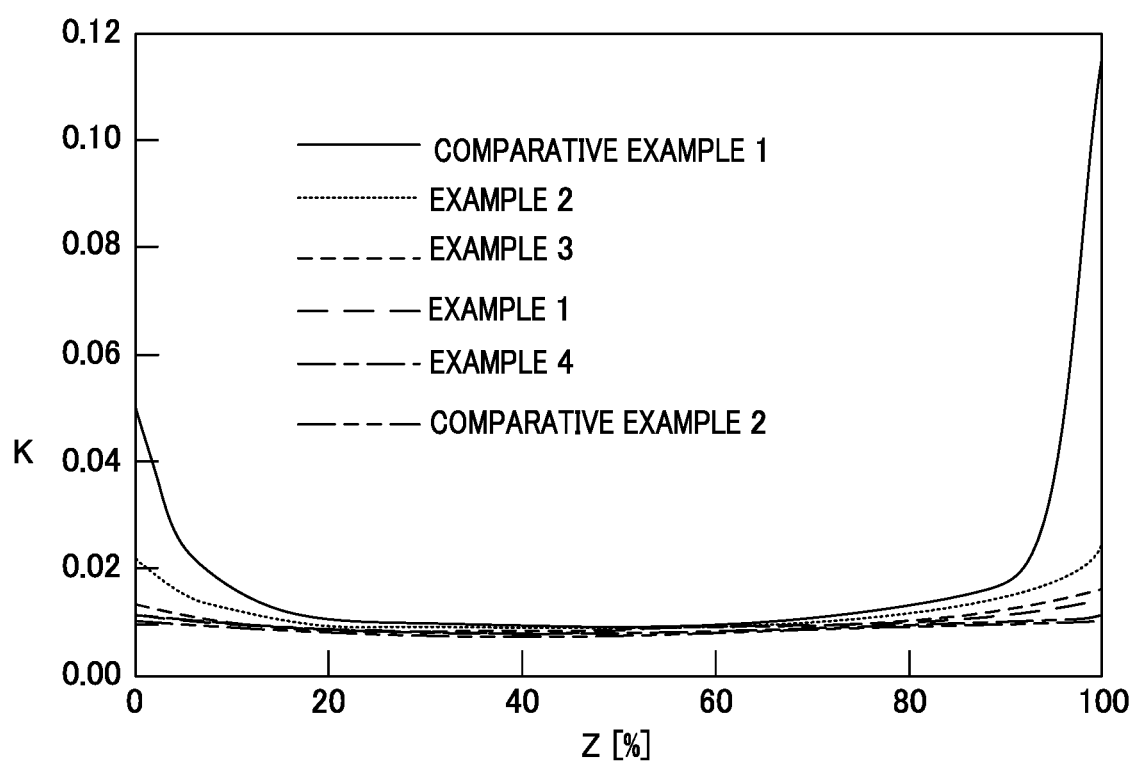
FIG. 12 is a graph illustrating the vertical color separation of the EC elements of Examples.

The graph of FIG. 12 was plotted with the axis of abscissas illustrating the positions of the effective optical regions 32 of EC elements in the vertical direction by defining the uppermost part as 0% and the lowermost part as 100% and the axis of ordinates illustrating the absolute value K of the gradient of d(ΔOD) calculated from the profiles of the simulation images of the EC elements. In FIG. 12, it can be confirmed that the EC element of Example 1 has a still smaller value of the K than the EC element of Comparative Example 1.

EC elements were manufactured and evaluated by changing the size of the transmittance variable region 31 and changing d1/L1 and d2/L1 to 0.075 (Example 2), 0.15 (Example 3), 0.25 (Example 4) and 0.30 (Comparative Example 2). As a result, it was found that as the d1/L1 and the d2/L1 became larger, the value of the K became smaller, and the effect of suppressing color separation became higher. However, example 4 the d1/L1 and the d2/L1 of which are 0.25 and Comparative Example 2 the d1/L1 and the d2/L1 of which are 0.30 have substantially the same effect of suppressing color separation, and the area outside the effective optical region 32 simply increases. Therefore, it was found that the d1/L1 and the d2/L1 were preferably 0.25 or less.

The EC elements of Example 5 and Comparative Example 3 were manufactured and evaluated using the same technique as the above-mentioned EC elements of example 1 and Comparative Example 1 and using the combination of a compound (4) as an anodic EC compound and the compound (3) as a cathodic EC compound.

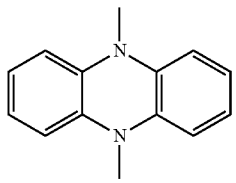

(4)

(Evaluation Result)

It was found that the homogeneity of colors of an RGB image is improved still further in Example 5 than in Comparative Example 3 similarly to the comparison of Example 1 and Comparative Example 1.

Figure 13:
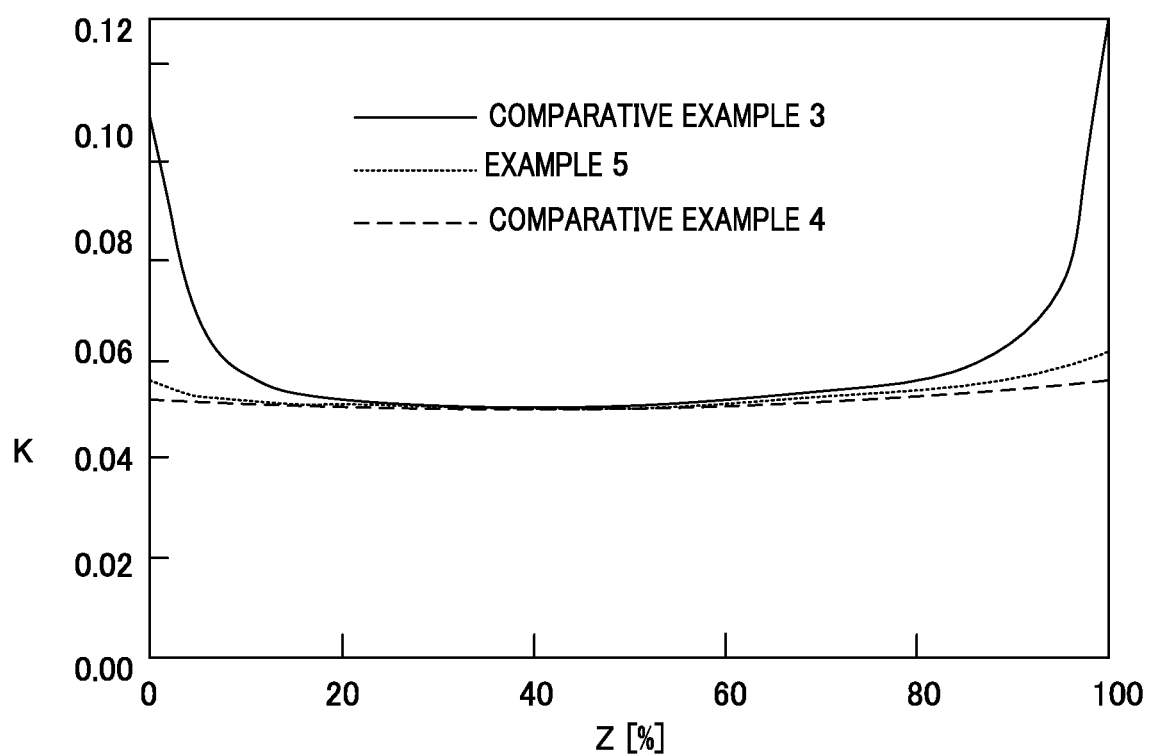
FIG. 13 is another graph illustrating the vertical color separation of the EC elements of other Examples.

The graph of FIG. 13 displays the results of Example 5 and Comparative Examples 3 and 4 using the same method as FIG. 12. In FIG. 13, it can be confirmed that the EC element of Example 5 has a still smaller value of the K than the EC element of Comparative Example 3.

EC elements were manufactured and evaluated by changing the size of the transmittance variable region 31 and changing the d1/L1 and the d2/L1 to 0 (Comparative Example 3), 0.15 (Example 5), and 0.30 (Comparative Example 4). As a result, it was found that as the d1/L1 and the d2/L1 became larger, the value of the K became smaller, and the effect of suppressing color separation became higher. However, it was found that example 5 the d1/L1 and the d2/L1 of which were 0.15 and Comparative Example 4 the d1/L1 and the d2/L1 of which were 0.30 had substantially the same effect of suppressing color separation, and the area outside the effective optical region 32 simply increases.

The EC elements of Example 6 and Comparative Examples 5, 6 were manufactured and evaluated using the same technique as the above-mentioned EC elements of example 1 and Comparative Example 1 and using the combination of the compound (2) as an anodic EC compound and a compound (5) as a cathodic EC compound.

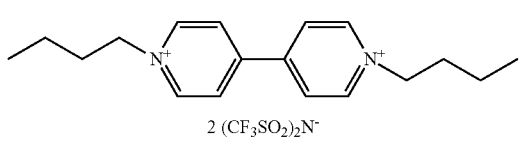

(5)

(Evaluation Result)

It was found that the homogeneity of colors of an RGB image is improved still further in example 6 than in Comparative Example 5 similarly to the comparison of Example 1 and Comparative Example 1.

Figure 14:
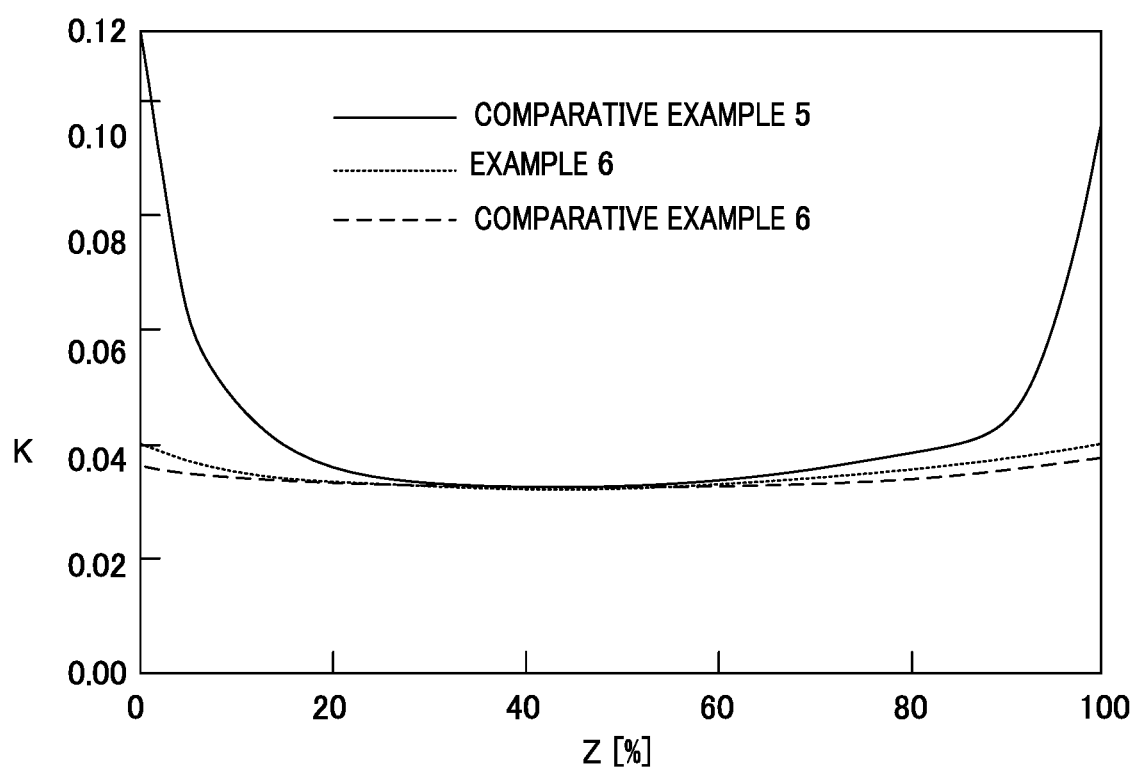
FIG. 14 is yet another graph illustrating the vertical color separation of the EC elements of other Examples.

The graph of FIG. 14 displays the results of example 6 and Comparative Examples 5 and 6 using the same method as FIG. 12. In FIG. 14, it can be confirmed that the EC element of example 6 has a still smaller value of the K than the EC element of Comparative Example 5.

EC elements were manufactured and evaluated by changing the size of the transmittance variable region 31 and changing the d1/L1 and the d2/L1 to 0 (Comparative Example 5), 0.15 (example 6), and 0.30 (Comparative Example 6). As a result, it was found that as the d1/L1 and the d2/L1 became larger, the value of the K became smaller, and the effect of suppressing color separation became higher. However, it was found that example 6 the d1/L1 and the d2/L1 of which were 0.15 and Comparative Example 6 the d1/L1 and the d2/L1 of which were 0.30 had substantially the same effect of suppressing color separation, and the area outside the effective optical region 32 simply increases.

According to the present invention, a predetermined region dares to be disposed outside an effective optical region within a transmittance variable region, and an EC element wherein the influence of vertical color separation is excluded, in-plane transmittance is homogenized without affecting response speed is provided thereby. Therefore, an imaging apparatus having a high-resolution display and a transmittance variable window having little color inhomogeneity are provided using such an EC element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-095828, filed May 18, 2018, and Japanese Patent Application No. 2019-062694, filed Mar. 28, 2019, which are hereby incorporated by reference herein in their entirety.

What is claimed is:

1. An electrochromic element, comprising:
a first electrode;
a second electrode;
an electrochromic layer disposed between the first electrode and the second electrode; and
the electrochromic element having an effective optical region within a transmittance variable region,
wherein:
when a shortest distance from an end of the effective optical region to an end of the transmittance variable region is d and a length of the transmittance variable region on a straight line including the shortest distance is L in one direction in a plane of the effective optical region, d is 7.5 to 25% of L at both ends of the one direction;
the transmittance variable region includes a color inhomogeneity part; and
the color inhomogeneity part is not in the effective optical region.

2. The electrochromic element according to claim 1, wherein the effective optical region is a quadrangle, and the one direction is parallel to one side of the quadrangle.

3. The electrochromic element according to claim 2, wherein the effective optical region is a square or a rectangle.

4. The electrochromic element according to claim 1, which is configured such that the one direction is vertical in a use environment of the electrochromic element.

5. The electrochromic element according to claim 1, wherein d is 15 to 25% of L.

6. The electrochromic element according to claim 1, comprising metal wiring electroconductive to the first electrode or the second electrode on the outside of the effective optical region in the one direction.

7. The electrochromic element according to claim 1, wherein a concentration of at least one of the anodic electrochromic compound and the cathodic electrochromic compound is 0.05 mol/L or more.

8. The electrochromic element according to claim 1, wherein the anodic electrochromic compound is a dihydrophenazine derivative.

9. The electrochromic element according to claim 1, wherein the cathodic electrochromic compound is a pyridine derivative.

10. An imaging apparatus, comprising:
a lens unit comprising a plurality of lenses;
an imaging element which receives light having passed the lens unit; and
the electrochromic element according to claim 1 disposed on a subject side of the imaging element.

11. A transmittance variable window, comprising:
a pair of transparent protective substrates;
the electrochromic element according to claim 1 disposed between the pair of transparent protective substrates; and
a window frame into which peripheral edges of the transparent protective substrates and the electrochromic element are fitted.

12. The electrochromic element according to claim 1, wherein an average value of an index of color inhomogeneity d($\Delta$OD) of the color inhomogeneity part is more than 0.01.

13. The electrochromic element according to claim 1, wherein the electrochromic layer comprises an anodic electrochromic compound and a cathodic electrochromic compound.

14. An electrochromic element, comprising:
a first electrode;
a second electrode; and
an electrochromic layer disposed between the first electrode and the second electrode,
the electrochromic element having an effective optical region within a transmittance variable region, and comprising a shield part covering a region from an end of the effective optical region to an end of the transmittance variable region along the end of the effective optical region,
wherein:
a shortest distance from the end of the effective optical region to the end of the transmittance variable region in the shield part is 7.5 to 25% of a length of the transmittance variable region on a straight line including the shortest distance;
the shielding region of the electrochromic layer includes a color inhomogeneity part; and
the effective optical region of the electrochromic layer does not include the color inhomogeneity part.

15. The electrochromic element according to claim 14, wherein the effective optical region is a quadrangle, and
the shield part is disposed along one side of the quadrangle.

16. The electrochromic element according to claim 15, wherein the effective optical region is a square or a rectangle.

17. The electrochromic element according to claim 14, wherein the shield part is disposed on the opposite sides so as to sandwich the effective optical region.

18. An imaging apparatus, comprising:
a lens unit comprising a plurality of lenses;
an imaging element that receives light having passed the lens unit; and
the electrochromic element according to claim 14 disposed on a subject side of the imaging element.

19. The electrochromic element according to claim 14, wherein an average value of an index of color inhomogeneity d($\Delta$OD) of the color inhomogeneity part is more than 0.01.

20. The electrochromic element according to claim 14, wherein the electrochromic layer comprises an anodic electrochromic compound and a cathodic electrochromic compound.

* * * * *